United States Patent
Ekanayake et al.

(10) Patent No.: US 11,245,949 B2
(45) Date of Patent: Feb. 8, 2022

(54) SECURE CONFERENCING DEVICE

(71) Applicant: Elo Touch Solutions, Inc., Milpitas, CA (US)

(72) Inventors: Asela Ekanayake, Santa Clara, CA (US); Jiachi Zhang, Santa Clara, CA (US); Fareed Uddin, San Jose, CA (US); Brian Perry, Knoxville, TN (US); Kenneth John North, San Carlos, CA (US); Qianying Bao, San Ramon, CA (US); Chia-Lun Yang, San Jose, CA (US); Michael Rally, San Jose, CA (US)

(73) Assignee: Elo Touch Solutions, Inc., Milpitas, CA (US)

( * ) Notice: Subject to any disclaimer, the term of this patent is extended or adjusted under 35 U.S.C. 154(b) by 0 days.

(21) Appl. No.: 16/887,613

(22) Filed: May 29, 2020

(65) Prior Publication Data

US 2021/0377587 A1 Dec. 2, 2021

(51) Int. Cl.
*H04N 21/414* (2011.01)
*H04L 29/06* (2006.01)
*H04L 12/18* (2006.01)

(52) U.S. Cl.
CPC ... *H04N 21/41415* (2013.01); *H04L 12/1813* (2013.01); *H04L 12/1836* (2013.01); *H04L 63/0428* (2013.01)

(58) Field of Classification Search
CPC ............. H04N 21/41415; H04N 21/41; H04N 21/4104; H04N 21/42203; H04N 21/4788; H04L 63/0428; H04L 12/1813
See application file for complete search history.

(56) References Cited

U.S. PATENT DOCUMENTS

| | | | | |
|---|---|---|---|---|
| 5,434,913 A | * | 7/1995 | Tung | H04L 12/1813 348/E7.083 |
| 5,611,038 A | * | 3/1997 | Shaw | H04M 3/567 715/202 |

(Continued)

FOREIGN PATENT DOCUMENTS

EP   2418847 A1   2/2012

OTHER PUBLICATIONS

International Search Report and Written Opinion of the International Searching Authority directed to related International Patent Application No. PCT/US2021/020481, dated Jun. 14, 2021; 13 pages.

*Primary Examiner* — James R Sheleheda
*Assistant Examiner* — Timothy R Newlin
(74) *Attorney, Agent, or Firm* — Sterne, Kessler, Goldstein & Fox P.L.L.C.

(57) ABSTRACT

A secure conferencing device operating in a host or a guest mode. In host mode, the secure conferencing device coupled to an interactive digital signage (IDS) device, grants conference control to a host computer of the IDS device. The secure conferencing device receives a guest control signal and a guest video stream from a guest device, where the secure conferencing device prevents the guest control signal from being communicated to the host computer, yet transmits the guest video stream to the host computer for display on the IDS device. In the guest mode, the secure conferencing device grants conference control to a guest device, enables the guest device to affect a component of the IDS device, but does not enable the guest device to communicate guest control signals to the host computer of the IDS device.

20 Claims, 12 Drawing Sheets

(56) References Cited

U.S. PATENT DOCUMENTS

| | | | |
|---|---|---|---|
| 6,894,219 B2* | 5/2005 | Culbertson | H01R 13/72 174/41 |
| 9,774,824 B1* | 9/2017 | Brady | H04W 4/021 |
| 10,420,011 B2 | 9/2019 | Miyamoto et al. | |
| 10,785,271 B1* | 9/2020 | Gunnalan | H04L 65/1069 |
| 2003/0145052 A1* | 7/2003 | Watanabe | H04L 29/12009 709/204 |
| 2005/0005305 A1* | 1/2005 | Shachar | H04N 21/43632 725/131 |
| 2005/0268242 A1* | 12/2005 | White | H04L 12/1813 715/751 |
| 2008/0112337 A1* | 5/2008 | Shaffer | H04L 12/1813 370/260 |
| 2011/0074913 A1* | 3/2011 | Kulkarni | H04L 65/403 348/14.08 |
| 2011/0216674 A1* | 9/2011 | McDonald | H04L 12/1836 370/260 |
| 2013/0147903 A1 | 6/2013 | Weiser et al. | |
| 2013/0152153 A1* | 6/2013 | Weiser | H04L 65/1006 726/1 |
| 2017/0237784 A1* | 8/2017 | Maistri | H04L 65/1083 348/14.02 |
| 2017/0295102 A1* | 10/2017 | Adams | H04L 65/608 |
| 2017/0374114 A1* | 12/2017 | Feldman | H04L 65/1063 |
| 2018/0048863 A1* | 2/2018 | Delorenzi | H04W 4/06 |
| 2019/0020853 A1* | 1/2019 | Segal | H04N 21/4223 |
| 2020/0021625 A1* | 1/2020 | Chan | H04L 65/1069 |

* cited by examiner

SECURE CONFERENCING DEVICE

BACKGROUND

Field

The present disclosure relates generally to a conferencing device, and in particular, a conferencing device that enables secure operations with Interactive Digital Signage (IDS).

Background Art

Conference devices can be connected to a simple display and to a laptop. An image on the laptop can be displayed on the simple display via the conference device.

SUMMARY

Some embodiments include a system, method, computer program product, and/or combination(s) or sub-combination (s) thereof, for a secure conferencing device. Some embodiments include a processor and a firewall component of a secure conferencing device. The processor can transmit a host mode signal to an interactive digital signage (IDS) device granting conference control to a host computer of the IDS device. The processor can transmit, via a single cable, the host mode signal to the IDS device, where the single cable is capable of transmitting video, audio, control, and power signals.

Based at least on the host mode signal, the processor can configure the firewall component to enable communications between the processor and the host computer. In some embodiments, the processor can receive a first audio signal from the microphone, and transmit, via the firewall component, the first audio signal to the host computer. The processor can also receive a guest video stream from a guest device, and transmit the guest video stream to the host computer, where first video images of the guest video stream are displayed on the IDS device. In some embodiments, the processor can receive via a universal serial bus (USB) cable, data, where the data includes a guest control signal and the guest video stream, where the firewall component prevents the guest control signal from being communicated to the host computer. The processor can obtain the guest video stream from the data.

The secure conferencing device can include a cable retainer that prevents a cable from being readily removed from the secure conferencing device. The cable retainer interlocks with a portion of a cable from which the guest video stream is received. The cable retainer is affixed to the secure conferencing device, wherein the cable retainer and the exterior of the secure conferencing device together appear as a uniform surface.

The secure conferencing device can include one or more sets of visual indicators located on a perimeter of the secure conferencing device coupled to the processor, where the processor can determine a first quality of the first audio signal, and based at least on the first quality, transmit a signal to a first set of visual indicators of the one or more sets of visual indicators, where the signal causes the first set of visual indicators to correspond to the first quality. In some embodiments, the first set of visual indicators are in closer proximity to a direction in which the first audio signal is received compared to the one or more remaining sets of visual indicators.

The processor can receive a remote signal from the IDS device, where the remote signal corresponds to the first video images received by a remote meeting participant. One or more visual indicators of the first set of visual indicators corresponds to a quality of the remote signal.

The secure conferencing device can include a speaker positioned a distance from the microphone, where output from the speaker is directed away from the microphone, and where the speaker is coupled to the processor. The processor can receive, via the firewall component, a second audio signal from the host computer, and output, via the speaker, the second audio signal, where the second audio signal travels in a direction away from the microphone.

The processor can transmit a guest mode signal to the IDS device granting conference control to the guest device coupled to the secure conferencing device, and based at least on the guest mode signal, configure the firewall component to enable communications between the guest device and the processor, as well as between the processor and the IDS device. In the guest mode, the processor can receive a second audio signal from the microphone, and transmit, via the firewall component, the second audio signal to the guest device. The processor can receive, via the firewall component, a guest control signal from the guest device, and transmit via the firewall component, the guest control signal to the IDS device, where the guest control signal affects a component of the IDS such as a camera or a touchscreen of the IDS device. In the guest mode, the processor can receive second video images from the guest device, and transmit the second video images to the IDS device, where the second video images are displayed on the IDS device.

Some embodiments include an (IDS) device that includes a firewall component coupled to a processor and a host computer. The processor can receive a host mode signal granting conference control to the host computer, and based at least on the host mode signal, configure the firewall component to enable communications between a secure conferencing device and the processor, and between the processor and the host computer. The processor can receive, via the firewall component, a first audio signal from the secure conferencing device, and transmit, via the firewall component, the first audio signal to the host computer. In response to the transmission of the first audio signal, the processor can transmit, via the firewall component, a second audio signal from the host computer to the secure conferencing device, where the second audio signal is output to a speaker of the secure conferencing device.

The processor can receive a guest video stream from the secure conferencing device, enable transmission of the guest video stream to the host computer, receive guest video images of the guest video stream from the host computer, and display the guest video images on the IDS device.

The processor can receive a guest mode signal granting conference control to a guest device coupled to the secure conferencing device, and based at least on the guest mode signal, configure the firewall component to enable reception of guest control signals, where the firewall component prevents a guest control signal from being transmitted to the host computer. The processor can receive, via the firewall component, a guest control signal from the secure conferencing device, and based on at least the guest control signal, affect a camera or a touchscreen of the IDS device, where the camera and the touchscreen are coupled to the processor. The processor can receive guest video images from the secure conferencing device, and display the guest video images on the IDS device.

Further embodiments, features, and advantages of the present disclosure, as well as the structure and operation of the various embodiments of the present disclosure, are described in detail below with reference to the accompanying drawings.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and to enable a person skilled in the relevant art(s) to make and use the disclosure.

Figure 1:
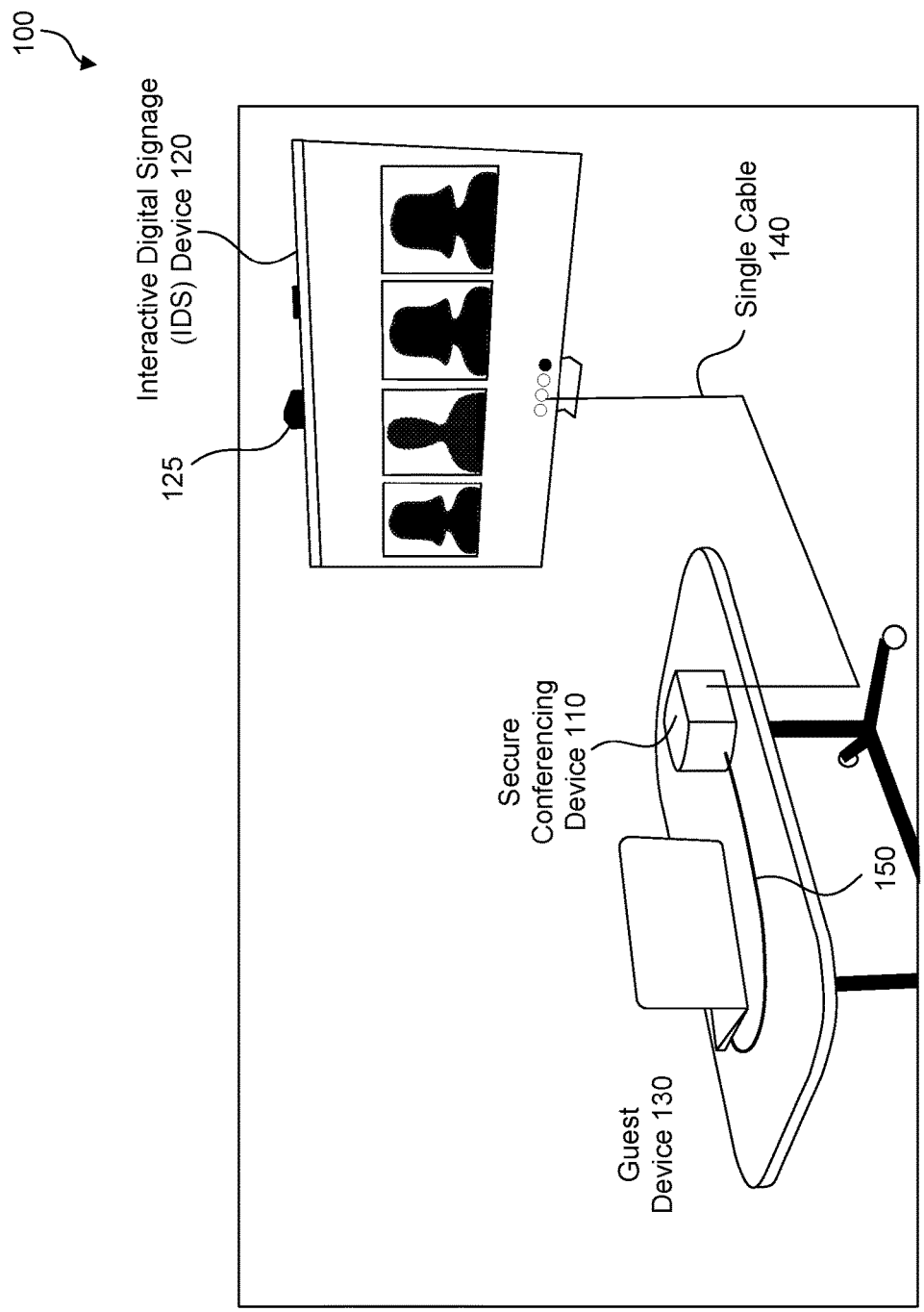
FIG. 1 illustrates an example system supporting a secure conferencing device, according to an exemplary embodiment of the disclosure.

The present disclosure will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following Detailed Description of the present disclosure refers to the accompanying drawings that illustrate exemplary embodiments consistent with this disclosure. The exemplary embodiments will fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein. Therefore, the detailed description is not meant to limit the present disclosure.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

A conference device can be coupled to a wall mounted display, a simple peripheral for displaying images. The wall mounted display is a "slave" to software running on the conference device considered the "master." In some examples, a laptop can be connected to the conference device and images from the laptop can be displayed on the wall mounted display. Nowadays, malicious software can persist on electronic devices, unbeknownst to the owners of the electronic devices. For example, problems can arise as malicious software on the laptop can infect the conference device. Further, when the simple peripheral is replaced by a sophisticated interactive digital signage (IDS) device mounted on a wall that includes a host computer for example, malicious software on the laptop can infect the IDS device and/or the host computer. Conversely, the IDS device and/or the host computer on the IDS device could include malicious software that can infect the laptop coupled to the conference device. Some embodiments include a secure conferencing device coupled to an IDS device that address these concerns.

Some embodiments include a secure conferencing device that includes a firewall component that prevents malicious code from being communicated via USB connections from a guest device to a host computer in an IDS device. Some embodiments include engineering program memories within a secure conferencing device, an IDS device, and/or a host computer to be in a read-only mode in normal operations to avoid communicating malicious codes to devices. Some embodiments also take advantage of video connection formats to transmit video streams as it is difficult if not impossible for malicious codes to inadvertently be transferred for example, via a high-definition multimedia interface (HDMI) cable. Other video connection formats are possible.

FIG. 1 illustrates an example system 100 supporting a secure conferencing device 110, according to an exemplary embodiment of the disclosure. System 100 includes secure conferencing device 110 coupled to IDS device 120 via single cable 140. System 100 can be in a hosting company's meeting room, for example. Secure conferencing device 110 is also coupled to guest device 130 via connection 150. Connection 150 can be, for example, a universal serial bus (USB) cable and/or an HDMI cable. Guest device 130 includes but is not limited to a laptop, a portable computer, a mobile computing device, a smart phone, and/or a tablet. IDS device 120 comprises a touch input device, a video output device, as well as a host computer. Thus, IDS device 120 is a touch/display/computer device such as an all-in-one touch/display device which is very different than a simple display peripheral such as a wall mounted display. For example, during a presentation, a presenter can utilize the touchscreen of IDS device 120, even if guest device 130 is the source of an image presented on IDS device 120. IDS device 120 can include camera 125 (e.g., a webcam) that can capture images within the meeting room.

Secure conferencing device 110 can operate in at least two conferencing modes: host mode and guest mode. Secure conferencing device 110 controls whether guest device 130 or a host computer of IDS device 120 runs conferencing software such as Microsoft® Teams or GoToMeeting™ that allows remote participants to join a meeting held in the meeting room. Secure conferencing device 110 can be in a standby mode before any devices are coupled to secure conferencing device 110.

IDS device 120 can be connected to the hosting company's secure network (not shown) and a host computer within IDS device 120 can run the conferencing software that allows remote participants to join a meeting. For example, an employee of the hosting company in the conference room can use IDS device 120 to give a slide presentation that is viewed by the remote participants as well as guests present in the meeting room. In some examples, a guest may want to share a presentation located on guest device 130 while IDS device 120 is running the conferencing software. But connecting guest device 130 directly to IDS device 120 may expose each device to potential malicious software that can exist on either device, or enable the malicious software to gain access to the hosting company's secure network.

Figure 2:
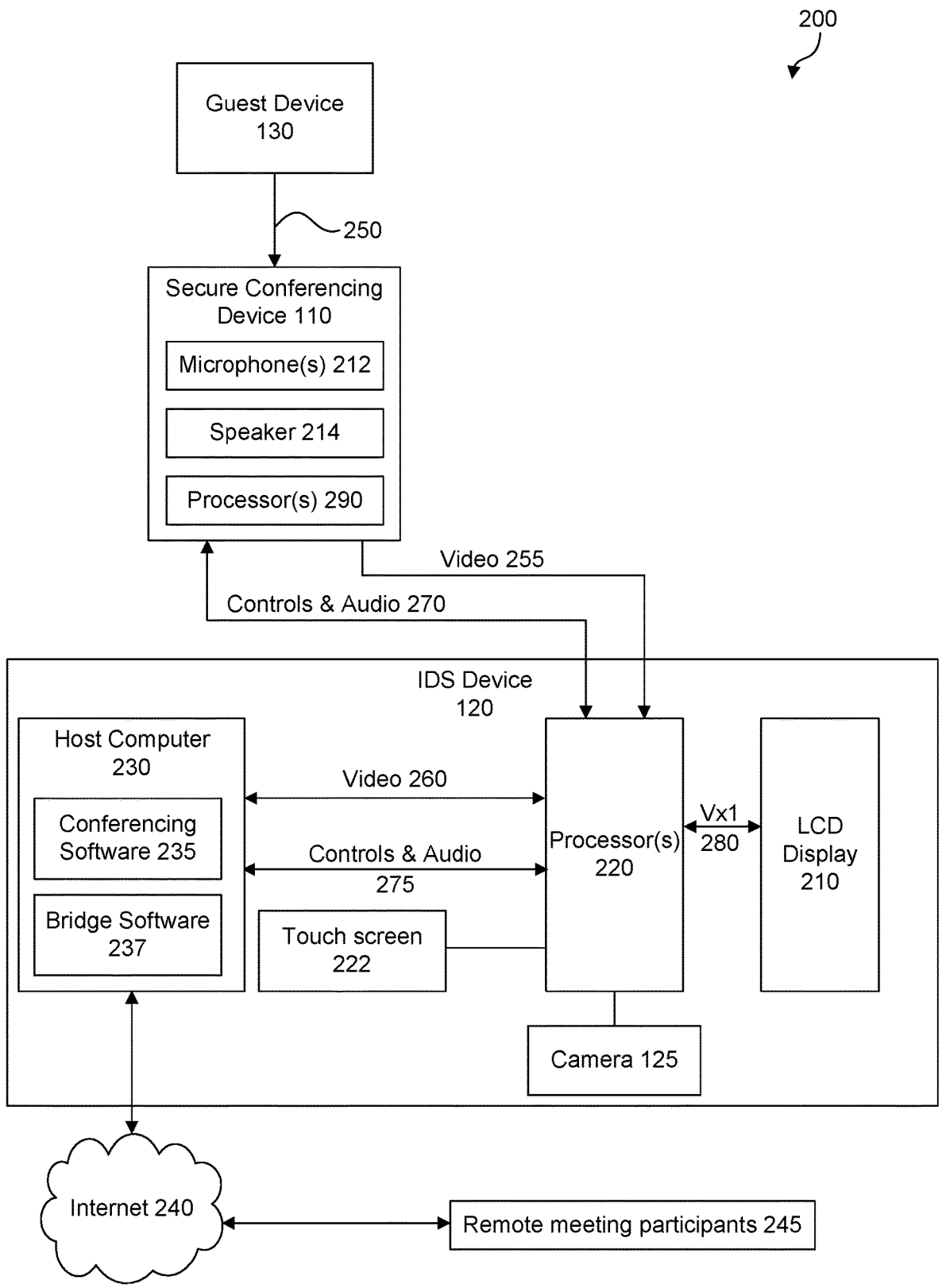
FIG. 2 illustrates an example system supporting a secure conferencing device in host mode, according to an exemplary embodiment of the disclosure.

FIG. 2 illustrates an example system 200 supporting secure conferencing device 110 in host mode, according to an exemplary embodiment of the disclosure. As a convenience and not a limitation, system 200 may be described with elements from FIG. 1. In system 200, host computer 230 of IDS device 120 runs conferencing software 235 and secure conferencing device 110 is in host mode. For example, system 200 includes guest device 130 (optional), secure conferencing device 110 in host mode, IDS device 120 coupled to remote meeting participants 245 via Internet 240. Although shown as a single item, remote meeting participants 245 may include one or more diverse locations. Secure conferencing device 110 includes one or more microphones 212, a speaker 214, and one or more processors 290. IDS device 120 includes host computer 230, one or more processors 220, liquid crystal display (LCD) 210, and components including but not limited to touchscreen 222 and/or camera 125. Host computer 230 can run conferencing software 235, and bridge software 237 that detects which type of conferencing software application is running, and adapts communications to secure conferencing device 110 accordingly. In some embodiments, LCD 210 may be replaced by another type of display such as an organic light emitting diode (OLED) display.

To demonstrate some embodiments of secure conferencing device 110 in host mode, the following scenarios are described: i) conferencing software 235 manages images displayed on IDS device 120 from sources: host computer 230, remote meeting participant 245, guest device 130; ii) conferencing software 235 manages audio received from one or more microphones 212; and iii) conferencing software 235 controls components of IDS device 120. Each of these are described further below.

Managing images displayed on IDS device 120: In system 200, conferencing software 235 on host computer 230 enables the display of images on LCD 210 from presentation files on host computer 230 as well as from remote meeting participants 245. For example, a remote video stream can be received by conferencing software 235 from a remote meeting participant 245 via Internet 240. Conferencing software 235 can process the remote video stream and transmit corresponding remote video images via video connection 260 to one or more processors 220. One or more processors 220 can transmit the corresponding remote video images via Vx1 connection 280 to be displayed on LCD 210.

For a guest to share a presentation when host computer 230 is running conferencing software 235, guest device 130 can be coupled via connection 250 to secure conferencing device 110 in host mode. For example, connection 250 can be a video cable including but not limited to an HDMI cable. In some embodiments connection 250 can include but is not limited to a USB cable (e.g., USB 3.0 or USB-C.) If connection 250 is a USB connection that carries control signals and video streams, secure conferencing device 110 filters the control signals such that only the video streams are received (described in FIG. 4 below.) From guest device 130's point of view, connecting to secure conferencing device 110 appears to be a simple cable connection, similar to connecting a laptop to a monitor. In other words, no passwords or connections to the hosting company's secure network is necessary or required.

In an embodiment, guest device 130 is coupled to secure conferencing device 110, and secure conferencing device 110 can receive via connection 250, a guest video stream from guest device 130. One or more processors 290 transmit the guest video stream via video connection 255 to one or more processors 220. One or more processors 220 transmits the guest video stream via video connection 260 to conferencing software 235 on host computer 230 for processing. For example, conferencing software 235 can determine guest video images from the guest video stream, and transmit the guest video images via video connection 260 to one or more processors 220. One or more processors 220 can transmit the guest video images via Vx1 connection 280 to be displayed on LCD 210.

Managing audio received from one or more microphones 212: Secure conferencing device 110 supports audio for conferencing while in host mode: Audio data received from one or more microphones 212 of secure conferencing device 110 are transmitted to conferencing software 235 of host computer 230. For example, audio data received by one or more microphones 212 can be transmitted via controls & audio connection 270 to one or more processors 220. One or more processors 220 can transmit the audio data to conferencing software 235 via controls & audio connection 275 for processing. After processing, conferencing software 235 can transmit corresponding audio signals to secure conferencing device 110 to be output via speaker 214. For example, conferencing software 235 can transmit the corresponding audio signals via controls & audio connection 275 to one or more processors 220. One or more processors 220 can transmit the corresponding audio signals via controls & audio connection 270 to secure conferencing device 110. One or more processors 290 output the corresponding audio signals via speaker 214.

Controlling components of IDS device 120: While in host mode, conferencing software 235 of host computer 230 can affect components of IDS device 120 such as touchscreen 222 and/or camera 125. For example, conferencing software 235 can transmit a component control signal via controls & audio connection 275 to one or more processors 220. One or more processors 220 can transmit the component control signal to the corresponding component to affect a change (e.g., select a menu on touchscreen 222, adjust a direction or focus of camera 125.)

In an embodiment, secure conferencing device 110 can switch from host mode to guest mode with a selection of a button on secure conferencing device 110, and vice versa. For example, when a button on secure conferencing device 110 is pushed, secure conferencing device can switch from one conference mode to another.

Figure 3:
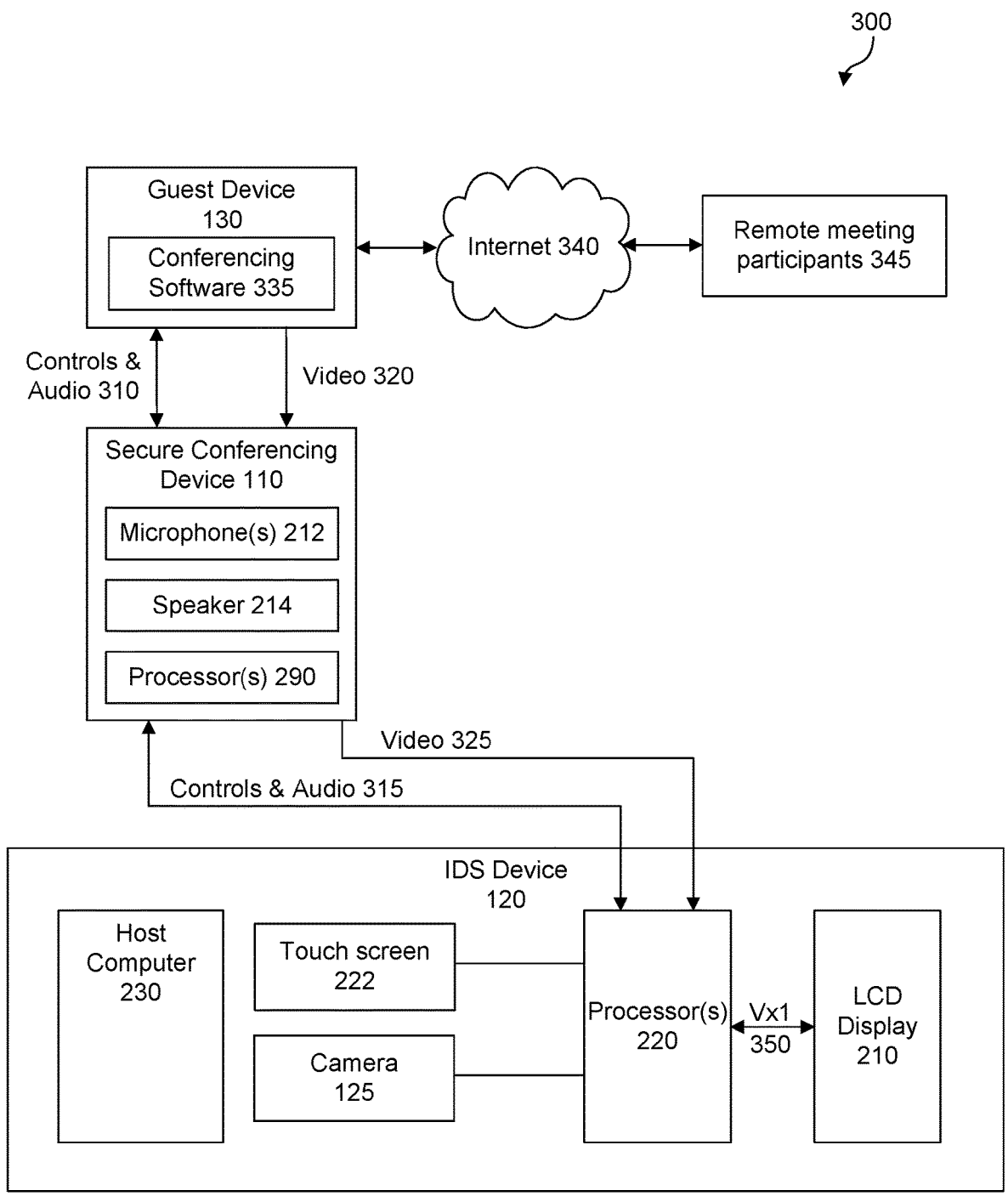
FIG. 3 illustrates an example system supporting a secure conferencing device in guest mode, according to an exemplary embodiment of the disclosure.

FIG. 3 illustrates an example system 300 supporting a secure conferencing device 110 in guest mode, according to an exemplary embodiment of the disclosure. As a convenience and not a limitation, system 300 may be described with elements from FIGS. 1 and 2. In system 300, guest device 130 runs conferencing software 335 and secure conferencing device 110 is in guest mode. For example, guest device 130 includes conferencing software 335, and guest device 130 is coupled to remote meeting participants 345 via Internet 340. Although shown as a single item, remote meeting participants 345 may include one or more diverse locations. Secure conferencing device 110 includes one or more microphones 212, a speaker 214, and one or more processors 290. IDS device 120 includes host computer 230, one or more processors 220, LCD 210, and components including but not limited to camera 125 and/or touchscreen 222.

Guest device 130 can be coupled to secure conferencing device 110 via one or more cables. For example, a single USB-C cable that provides video, audio, and control data connections can be employed. In another example, an HDMI cable that provides video connections and a USB cable that provides audio and control data connections can be employed. In some embodiments, secure conferencing device 110 detects a cable capable of providing control data connections and secure conferencing device 110 enters guest mode (e.g., from standby mode or from host mode.)

To demonstrate some embodiments of secure conferencing device 110 in guest mode, the following scenarios are described: i) conferencing software 335 manages images displayed on IDS device 120 from sources: remote meeting participant 345, guest device 130; ii) conferencing software 335 manages audio received from one or more microphones 212; and iii) conferencing software 335 controls components of IDS device 120. Each of these are described further below.

Managing images displayed on IDS device 120: In system 300, conferencing software 335 on guest device 130 enables the display of images on LCD 210 from presentation files on guest device 130 as well as from remote meeting participants 345, while host computer 230 is effectively disconnected from IDS device 120. For example, a remote video stream can be received by conferencing software 335 from a remote meeting participant 345 via Internet 340, but not via the hosting company's secure network. Thus, guest device 130 does not require password or a connection to the hosting company's secure network. Conferencing software 335 can process the remote video stream and transmit corresponding remote video images via video connection 320 (e.g., via an HDMI cable) to one or more processors 290. One or more processors 290 can transmit the corresponding remote video images via video connection 325 to one or more processors 220 of IDS device 120. One or more processors 220 can transmit the remote video images via Vx1 connection 350 to be displayed on LCD 210. Note that host computer 230 does not process any video streams or receive any remote video images. A similar process occurs for presentation files on guest device 130.

Managing audio received from one or more microphones 212: Secure conferencing device 110 supports audio for conferencing while in guest mode: Audio data received from one or more microphones 212 of secure conferencing device 110 are transmitted to guest device 130. For example, audio data received by one or more microphones 212 can be transmitted via controls & audio connection 310 to conferencing software 335 of guest device 130. After processing, conferencing software 335 can transmit corresponding audio signals to secure conferencing device 110 to be output via speaker 214. For example, conferencing software 335 can transmit the corresponding audio signals via controls & audio connection 310 to one or more processors 290. One or more processors 290 (e.g., codex 448) outputs the corresponding audio signals via speaker 214.

Controlling components of IDS device 120: While in guest mode, secure conferencing device 110 enables conferencing software 335 of guest device 130 to affect components of IDS device 120 such as touchscreen 222 and/or camera 125. For example, conferencing software 335 can transmit a component control signal via controls & audio connection 310 to one or more processors 290. One or more processors 290 can transmit the component control signal via controls & audio connection 315 to one or more processors 220 that transmit the component control signal to the corresponding component to affect a change (e.g., select a menu on touchscreen 222, adjust a direction or focus of camera 125.)

Code can be transmitted via USB connections. For example, during guest mode, if malicious code were transmitted from guest device 130 via controls & audio 310, and stored in program memory of one or more processors 290, when the mode changes to host mode, the malicious code could be transmitted to one or more processors 220 and/or host computer 230. A similar situation occurs if the host computer 230 includes malicious code, when starting in host mode and switching to guest mode. To avoid possible transmissions of malicious code, inadvertently or purposefully, program memory in one or more processors 290 is locked in read-only mode during normal operation (e.g., when secure conferencing device 110 is not being updated). Similarly, preventing acceptance of code for any devices coupled via USB connections to secure conferencing device 110 increases security. Accordingly, conference components (e.g., touchscreen 222 and/or camera 125) can be configured such that respective program memories and processors are locked in read-only mode during normal operations to prevent storage of additional code that could include malicious code. Any maintenance and/or update codes can be updated in one or more processors 290 and corresponding program memories and/or conference component processors and corresponding program memories (not shown) when secure conferencing device 110, IDS device 120, and/or host computer 230 of IDS device 120 coupled to secure conferencing device 110, are outside of either host or guest modes as described herein.

Figure 4:
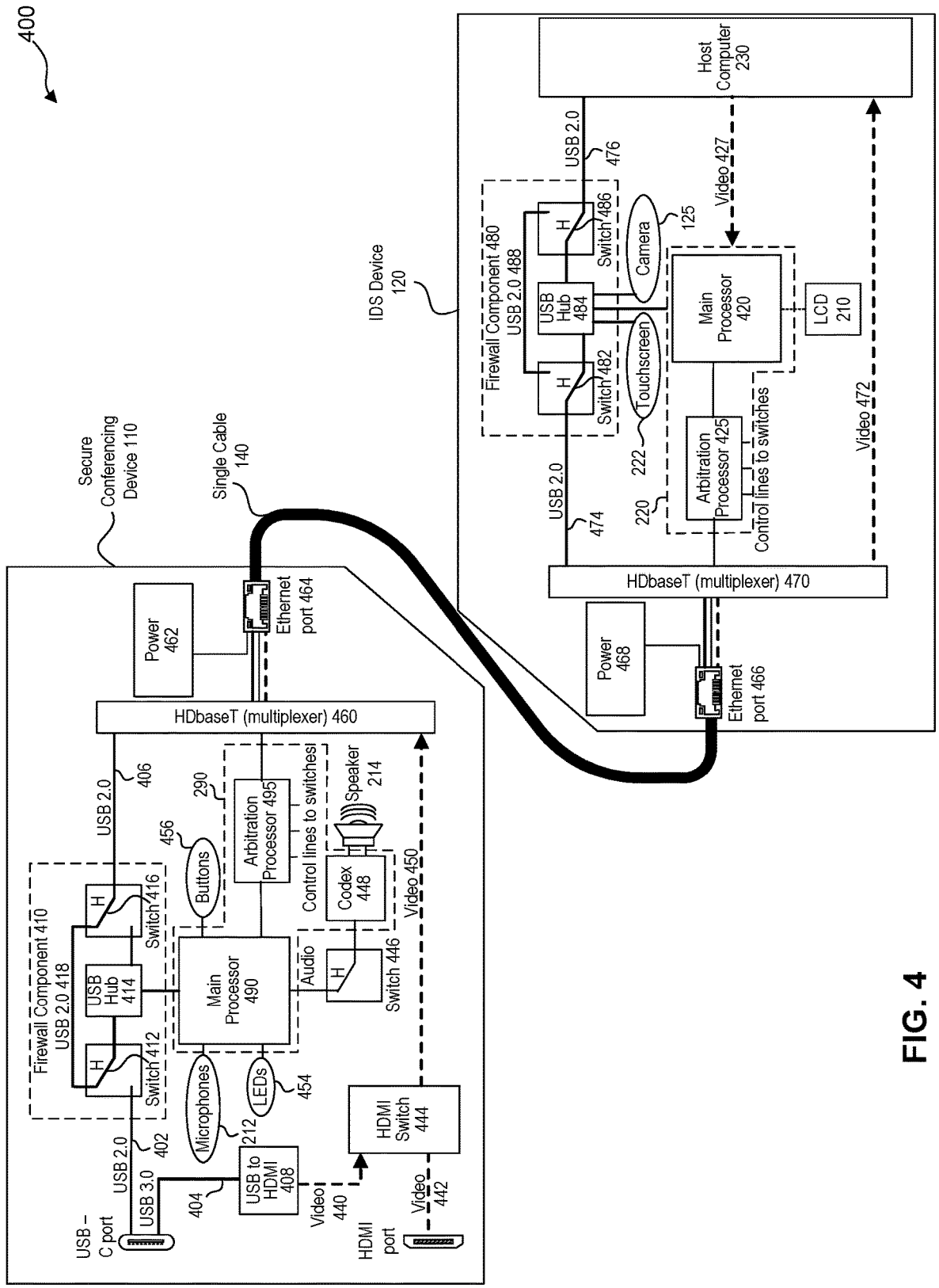
FIG. 4 illustrates a block diagram of an example system including simplified cabling, supporting a secure conferencing device in host mode, according to an exemplary embodiment of the disclosure.

FIG. 4 illustrates a block diagram of an example system 400 including simplified cabling, supporting a secure conferencing device in host mode, according to an exemplary embodiment of the disclosure. As a convenience and not a limitation, system 400 may be described with elements from FIGS. 1-3. System 400 includes secure conferencing device 110 in host mode, single cable 140, and IDS device 120. To demonstrate some embodiments of secure conferencing device 110 in host mode, the following scenarios are described: i) setting the mode; ii) conferencing software 235 manages the images display on IDS device 120 from sources: host computer 230, remote meeting participant 245, guest device 130; iii) conferencing software 235 manages audio received from one or more microphones 212; and iv) conferencing software 235 controls components of IDS device 120. Each of these are described further below.

Setting the mode: In some embodiments, secure conferencing device 110 defaults to a host mode if guest device 130 is not coupled to secure conferencing device 110 and IDS device 120 coupled to secure conferencing device 110 includes host computer 230. In some embodiments, secure conferencing device 110 can switch from guest mode to host mode with a selection of a button on secure conferencing device 110, and vice versa. For example, when secure conferencing device 110 is set to host mode (e.g., a button of one or more buttons 456 is pressed that selects host mode), one or more processors 290 configure firewall component 410, switch 446, and transmit a host mode signal to IDS device 120. One or more processors 290 can include main processor 490, arbitration processor 495, and codex 448. Firewall component 410 prevents malicious code on one computer (e.g., guest device 130) from reaching another computer (e.g., host computer 230 of IDS device 120) or vice versa. In host mode, arbitration processor 495 and/or main processor 490 can set switch 412 to prevent direct USB communications (e.g., controls signals, malicious code) between guest device 130 and secure conferencing device 110. In other words, firewall component 410 can be configured to prevent any control signals or malicious code from a USB connection from reaching IDS device 120 and hence, host computer 230 of IDS device 120. Firewall component 410 includes switch 412, USB hub 414, and switch 416. In host mode, switches 412 and 416 can be coupled to connection 418. In particular, switch 412 prevents a guest control signal from being transmitted to IDS device 120 that includes host computer 230. Thus, when secure conferencing device 110 is in host mode, no control signals or code (e.g., malicious code) from guest device 130 can be transmitted via secure conferencing device 110 to IDS unit 120. In addition, any malicious code residing on host computer 230 cannot be transmitted to guest device 130.

In an embodiment, arbitration processor 495 and/or main processor 490 can transmit the host mode signal via single cable 140, where the host mode signal is received via arbitration processor 425 of one or more processors 220. One or more processors 220 (e.g., main processor 420 and/or arbitration processor 425) can configure firewall component 480 to enable control and audio signals to be communicated to/from host computer 230 and secure conferencing device 110. For example, host control and/or audio signals can be transmitted from host computer 230 via connection 476, switch 486, USB hub 484, switch 482, connection 474, HDbaseT multiplexer 470, and single cable 140 to secure conferencing device 110.

Main processor 490 is coupled to arbitration processor 495, USB hub 414 of firewall component 410, one or more microphones 212, light emitting diodes (LEDs) 454, one or more buttons 456 (e.g., a button to switch from host mode to guest mode), and switch 446. In some embodiments LEDs 454 provide a visual indication of host mode, guest mode, and a standby mode that are visually distinct from each other. One or more processors 290 can configure switch 446 to enable audio signals to be output via codex 448 and speaker 214.

Managing images displayed on IDS device 120: In system 400, conferencing software 235 on host computer 230 enables the display of images on LCD 210 from presentation files on host computer 230 as well as from remote meeting participants 245 (not shown.) Conferencing software 235 can process the remote video stream and transmit corresponding remote video images via video connection 427 to one or more processors 220. One or more processors 220 can transmit the corresponding remote video images to be displayed on LCD 210.

For a guest to share a presentation when host computer 230 is running conferencing software 235, guest device 130 can be coupled to secure conferencing device 110 via one or more ports. The only data from guest device 130 that can pass through secure conferencing device 110 to IDS unit 120 is a video stream via video connection 450 and single cable 140. In an example, secure conferencing device 110 can receive a guest video stream from an HDMI port over video connection 442 and is received at HDMI switch 444. In another example, secure conferencing device 110 can receive data from a USB port including but not limited to a USB-C port that can receive USB 2.0 signals over connection 402 or USB 3.0 signals over connection 404. When guest data (e.g., a USB 3.0 signal) including a guest control signal and a guest video stream are received via connection 404, USB to HDMI 408 obtains the guest video stream from the guest data and transmits the guest video stream via video connection 440 to HDMI switch 444. Thus, a guest video stream from guest device 130 is transmitted via video connection 450 to IDS device 120 via HDbaseT multiplexer 460, Ethernet port 464, and single cable 140. IDS device 120 receives the guest video stream and one or more processors 220 enables the transmission of the guest video stream via video connection 472 to conferencing software 235 (not shown) on host computer 230. Conferencing software 235 can process the guest video stream, obtain corresponding guest video images, and transmit the guest video images via video connection 427 to one or more processors 220 so that the guest video images are displayed on LCD 210.

For completeness, HDbaseT multiplexer 460 multiplexes signals from connection 406, one or more processors 290, and video connection 450 to Ethernet port 464. In the reverse direction, HDbaseT multiplexer 460 can demultiplex signals received from Ethernet port 464. Power supply 462 provides a power signal to Ethernet port 464. Ethernet port 464 can be coupled to single cable 140 that can transport controls and audio signals, video streams, and power signals to IDS device 120.

IDS device 120 receives signals from secure conferencing device 110 via single cable 140 coupled to Ethernet port 466. Power supply 468 provides power to signals transmitted from IDS device 120 to secure conferencing device 110. HDbaseT multiplexer 470 demultiplexes the received signals to respective connection 474, one or more processors 220, and video connection 472. One or more processors 220 can include main processor 420 and arbitration processor 425 that controls lines to switches (e.g., switches 482 and 486.) Main processor 420 can be coupled to touchscreen 222, USB hub 484, camera 125, host computer 230 via at least video connection 427, and LCD 210. IDS device 120 also includes firewall component 480.

Managing audio received from one or more microphones 212: Secure conferencing device 110 supports audio for conferencing while in host mode: Audio data received from one or more microphones 212 of secure conferencing device 110 are transmitted to conferencing software 235 of host computer 230. For example, audio data received by one or more microphones 212 can be transmitted via USB hub 414, switch 412, connection 418, switch 416, connection 406, single cable 140, to IDS device 120. One or more processors 220 can enable the audio data to be transmitted via connection 474, switch 482, USB hub 484, switch 486, and connection 476 to conferencing software 235 of host computer 230 for processing. After processing, conferencing software 235 can transmit corresponding audio signals to secure conferencing device 110 to be output via speaker 214. For example, conferencing software 235 can transmit the corresponding audio signals via connection 476, switch 486, USB hub 484, switch 482, connection 474, HDbaseT multiplexer 470, and single cable 140 to secure conferencing device 110. One or more processors 290 can enable the transmission of the corresponding audio signals via connection 406, switch 416, connection 418, switch 412, USB hub 414, main processor 490, switch 446, codex 448, and output via speaker 214.

Controlling components of IDS device 120: While in host mode, conferencing software 235 of host computer 230 can affect components of IDS device 120 such as touchscreen 222 and/or camera 125. For example, conferencing software 235 can transmit a component control signal via connection 476, switch 486, USB hub 484, to one or more processors 220. One or more processors 220 can transmit the component control signal to the corresponding component to affect a change (e.g., select a menu on touchscreen 222, adjust a direction or focus of camera 125.)

Figure 5:
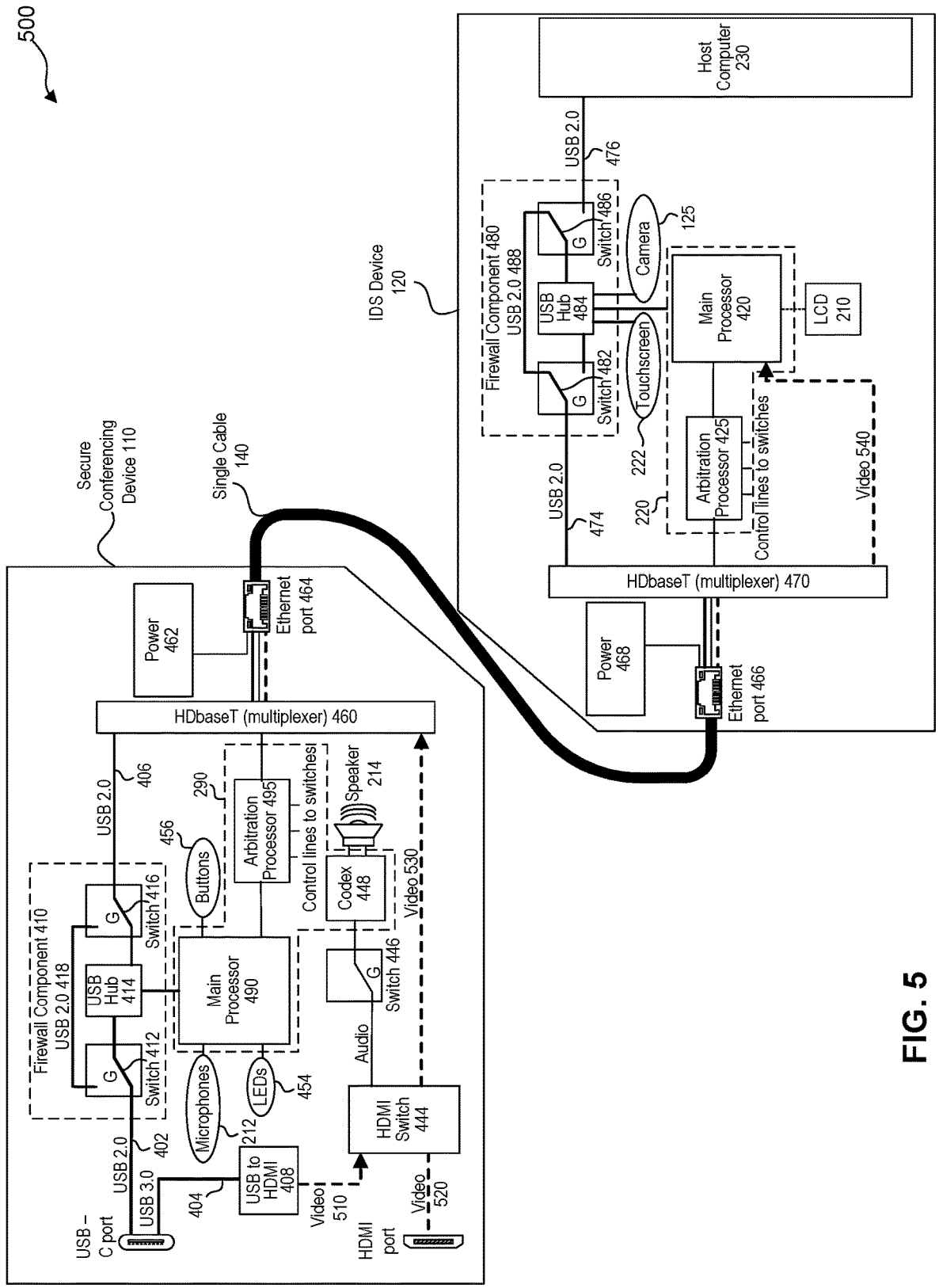
FIG. 5 illustrates a block diagram of an example system including simplified cabling, supporting a secure conferencing device in guest mode, according to an exemplary embodiment of the disclosure.

FIG. 5 illustrates a block diagram of an example system 500 including simplified cabling, supporting a secure conferencing device in guest mode, according to an exemplary embodiment of the disclosure. As a convenience and not a limitation, system 500 may be described with elements from FIGS. 1-4. System 500 includes secure conferencing device 110 in guest mode, single cable 140, and IDS device 120. To demonstrate some embodiments of secure conferencing device 110 in guest mode, the following scenarios are described: i) setting the mode; ii) conferencing software 335 manages the images display on IDS device 120 from sources: remote meeting participant 245, guest device 130; iii) conferencing software 335 manages audio received from one or more microphones 212; and iv) conferencing software 335 controls components of IDS device 120. Each of these are described further below.

Setting the mode: In some embodiments, secure conferencing device 110 defaults to a guest mode if guest device 130 is coupled to secure conferencing device 110 and host computer 230 is not present in IDS device 120. In some embodiments, when secure conferencing device 110 is in guest mode, host computer 230 in IDS device 120 is optional, and secure conferencing device 110 and corresponding IDS device 120 perform as described without host computer 230. In some embodiments, secure conferencing device 110 can switch from host mode to guest mode with a selection of a button on secure conferencing device 110, and vice versa. For example, in system 500, when secure conferencing device 110 is set to guest mode (e.g., a button of one or more buttons 456 is pressed that selects guest mode), one or more processors 290 configure firewall component 410, switch 446, and transmit a guest mode signal to IDS device 120. One or more processors 290 can include main processor 490, arbitration processor 495, and codex 448. Firewall component 410 enables audio and control signals to be exchanged between guest device 130 and secure conferencing device 110, as well as between secure conferencing device 110 and IDS device 120. Note that guest control signals are prevented by firewall component 480 and switch 486 in particular, from reaching host computer 230 as described below. For example, in guest mode, arbitration processor 495 and/or main processor 490 can set switch 412 to enable direct USB communications (e.g., controls signals, malicious code) between guest device 130 and secure conferencing device 110 and set switch 416 to enable communications between secure conferencing device 110 and IDS device 120.

One or more processors 290 (e.g., arbitration processor 495, main processor 490, and/or codex 448) can transmit the guest mode signal via single cable 140, where the guest mode signal is received via one or more processors 220. One or more processors 220 can configure firewall component 480 switches 482 and 486 to be positioned to enable guest control signals to be communicated from secure conferencing device 110 to one or more processors 220. Note that switch 486 prevents a guest control signal (or malicious code) from reaching host computer 230.

Managing images displayed on IDS device 120: In system 500, conferencing software 335 on guest device 130 enables the display of images on LCD 210 from presentation files on guest device 130 as well as from remote meeting participants 245 (not shown.) For example, conferencing software 335 (not shown) can process a guest video stream and transmit corresponding guest video images to secure conferencing device 110 via one or more ports. In an example, secure conferencing device 110 can receive guest video images from an HDMI port over video connection 520 that is received at HDMI switch 444. In another example, secure conferencing device 110 can receive data from a USB port including but not limited to a USB-C port that can receive USB 2.0 signals over connection 402 or USB 3.0 signals over connection 404. When guest data (e.g., a USB 3.0 signal) including a guest control signal and a guest video images are received via connection 404, USB to HDMI 408 obtains the guest video images from the guest data and transmits the guest video images via video connection 510 to HDMI switch 444. Thus, guest video images from guest device 130 are transmitted via video connection 530 to IDS device 120 via HDbaseT multiplexer 460, Ethernet port 464, and single cable 140. IDS device 120 receives the guest video images and one or more processors 220 enables the guest video images to be transmitted via video connection 540 to one or more processors 220. The guest video images are displayed on LCD 210. Notice that in contrast to the host mode, the guest video images and/or guest control signals are not communicated to host computer 230. Thus, host computer 230 is securely separated and hence protected from guest device 130 control, audio, and video signals. In other words, host computer 230 is effectively disconnected from secure conferencing device 110 as well as LCD 210 of IDS device 120.

For completeness, HDbaseT multiplexer 460 multiplexes signals from connection 406, one or more processors 290, and video connection 530 to Ethernet port 464. In the reverse direction, HDbaseT multiplexer 460 can demultiplex signals received from Ethernet port 464. Power supply 462 provides a power signal to Ethernet port 464. Ethernet port 464 can be coupled to single cable 140 that can transport controls and audio signals, video streams, and power signals to IDS device 120.

IDS device 120 receives signals from secure conferencing device 110 via single cable 140 coupled to Ethernet port 466. Power supply 468 provides power to signals transmitted from IDS device 120 to secure conferencing device 110. HDbaseT multiplexer 470 demultiplexes the received signals to respective connection 474, one or more processors 220, and video connection 540. One or more processors 220 can include main processor 420 and arbitration processor 425 that controls lines to switches (e.g., switches 482 and 486.) Main processor 420 can be coupled to touchscreen 222, USB hub 484, camera 125, video connection 540, and LCD 210. IDS device 120 also includes firewall component 480.

Managing audio received from one or more microphones 212: Secure conferencing device 110 supports audio for conferencing while in guest mode: Audio data received from one or more microphones 212 of secure conferencing device 110 are transmitted to conferencing software 335 (not shown) on guest device 130. For example, audio data received by one or more microphones 212 can be transmitted via USB hub 414, switch 412, and connection 402 to guest device 130. After processing, conferencing software 335 can transmit corresponding audio signals to secure conferencing device 110 to be output via speaker 214. The HDMI format has the flexibility to transmit audio information as well as image data. (This is as consumers experience when plugging an HDMI cable into a TV to watch a movie and hearing the movie's sound track as well as seeing images.) For example, conferencing software 335 can transmit the corresponding audio signals embedded in an HDMI video stream to secure conferencing device 110 via: video connection 520 to switch 446, codex 448, and output to speaker 214; and/or via connection 404, USB to HDMI 408, video connection 510, HDMI switch 444, switch 446, codex 448, and speaker 214.

Controlling components of IDS device 120: While in guest mode, conferencing software 335 of guest device 130 can affect components of IDS device 120 such as touchscreen 222 and/or camera 125. For example, conferencing software 335 can transmit a component control signal via connection 402, switch 412, USB hub 414, switch 416, connection 406, across single cable 140, to connection 474, switch 482, connection 488, switch 486, USB hub 484, to one or more processors 220. One or more processors 220 can transmit the component control signal to the corresponding component to affect a change (e.g., select a menu on touchscreen 222, adjust a direction or focus of camera 125.) Thus, even in guest mode, the components of IDS device 120 remain active for presenters to use while firewall component 480 (e.g., switch 486) prevents guest control signals from communicating with host computer 230.

Figure 6:
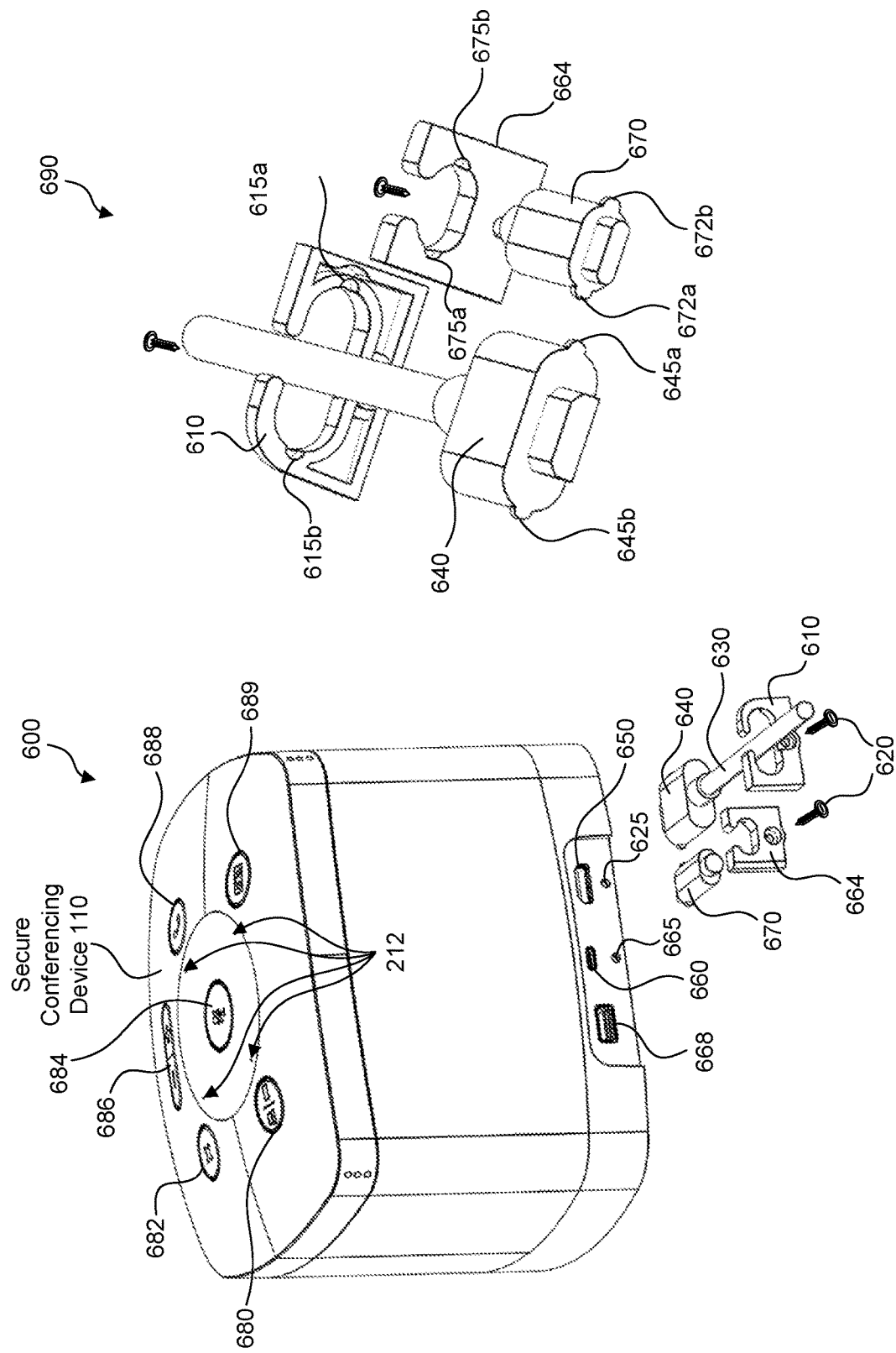
FIG. 6 illustrates examples of cable retainers for a secure conferencing device, according to an exemplary embodiment of the disclosure.

FIG. 6 illustrates examples of cable retainers for a secure conferencing device, according to an exemplary embodiment of the disclosure. As a convenience and not a limitation, system 600 may be described with elements from FIGS. 1-5. For example, in FIG. 1, secure conferencing device 110 can be coupled to guest device 130 via one or more cables 150. When guest device 130 is removed, many times one or more cables 150 are also removed. Some embodiments include one or more cable retainers that enable one or more cables 150 to be fastened to secure conferencing device 110, and/or prevent one or more cables from being coupled to secure conferencing device 110. When fastened to secure conferencing device 110, the cable retainers are configured to appear aesthetically, as one with secure conferencing device 110.

As shown in example 600, secure conferencing device 110 includes one or more buttons 456 (shown in FIG. 4) that support conferencing features: host/guest mode button 680, hang up button 682, mute button 684, volume control button 686, call button 688, and join meeting button 689. Hang up button 682, mute button 684, volume control button 686, and call button 688 can utilize human interface device (HID) communication protocols (e.g., USB standards.) For example, HID communication protocols can be implemented from one or more buttons 456 to one or more processors 290, controls and audio connection 270 to IDS device 120 at one or more processors 220 to and controls and audio connection 275 to conferencing software 235.

Host/guest mode button 680 and join meeting button 689, however, are unconventional conferencing functions and are not readily supported utilizing USB HID communication protocols. For example, the command protocol to join a meeting varies depending on the vendor the conferencing software. For example, the command protocol is different for various types of conferencing software applications (e.g., Microsoft Teams™, zoom, Skype, GoToMeeting™, etc.) At first glance this adds undesired complexity to code in one or more processors 290 that generates commands transmitted to conferencing software 235. But, the complexity can be avoided with the addition of bridge software 237 shown in FIG. 2.

With the addition of bridge software 237, the commands generated by one or more processors 290 may be independent of the choice of conferencing software 235 running on host computer 230. Assuming that conferencing software 235 is running on the host computer 230, bridge software 237 detects which type of conferencing software application is running. When bridge software 237 receives a join meeting triggered command (e.g., based on join meeting button 689 being selected) from one or more processors 290, bridge software 237 can translate the triggered command to the corresponding protocol understood by the currently running conferencing software 235. In some embodiments, if conferencing software 235 is not running on host computer 230, bridge software 237 can activate a default choice of conferencing software 235 in response to receiving a signal from one or more processors 290 based on join meeting button 689 being selected. With bridge software 237, coding and maintaining code updates for one or more processors 290 is simplified. For the user the software complexities of joining a meeting are hidden thus providing a user (e.g., presenter, speaker, meeting attendee) with a simple user experience.

As mentioned above, host/guest mode button 680 also provides unconventional conferencing functions not readily supported by USB HID communication protocols. Bridge software 237 can support functions of host/guest mode button 680. For example, if conferencing software 235 is not running when a user selects host mode (via host/guest mode button 680, or if a guest device is not coupled to secure conferencing device 110), bridge software 237 can launch the default choice of conferencing software 235 on host computer 230.

One or more buttons 456 of FIG. 4, including but not limited to: host/guest mode button 680, hang up button 682, mute button 684, volume control button 686, call button 688, and join meeting button 689 can be hardware buttons such as illustrated in FIG. 6. In some embodiments, one or more buttons 456 can be touch locations on the surface of a touch sensor or a touchscreen. For example, the top of secure conferencing device 110 may be a touch sensor including (e.g. a projected capacitive (PCAP) touchscreen) with a glass surface and graphics indicating touch locations for the various button functions. In some embodiments, the touch sensor may have transparent portions over a display in order to enable programmable touch buttons.

In some embodiments, secure conferencing device 110 button functions may be also be provided via voice control. For example, to the user, a voice command "join meeting" may have the same effect as selecting join meeting button 689, and likewise for other voice commends such as "volume up", "volume down", "mute", etc. Furthermore, the voice command vocabulary may be extended without cluttering the design of secure conferencing device 110. For example, and added voice command vocabulary may include "share document", "next page", etc. Secure conferencing device 110 can contain voice recognition capabilities so that one or more processors 290 may transmit commands in response to voice commands or button activations in the same manner from the perspective of IDS device 120. In some embodiments, when secure conferencing device 110 is in host mode, bridge software 237 may receive audio data from one or more microphones 212 and provide the voice recognition function.

Example 600 includes secure conferencing device 110, that includes video port 650 that includes but is not limited to an HDMI port, data port 660 that can include but is not limited to USB-C port, and data port 668 that can include but is not limited to a USB 2.0 port. Some embodiments include overmold 640 that includes a corresponding mate that couples to video port 650 on one end and a portion of overmold 640 is contoured to cable retainer 610 (e.g., contoured via patterned tabs 645a and 645b that interlock with receptacles 615a and 615b of example 690.) Overmold 640 is also coupled to cable 630 (e.g., an HDMI cable). Cable retainer 610 is secured to secure conferencing device 110 via fastener 620 at opening 625 which can be a threaded opening that enables fastener 620 to be secured. When cable retainer 610 is secured to secure conferencing device 110, the outer exposed surface of secure conferencing device 110 and cable retainer 610 are flush, match, and appear as a single uniform surface. In some embodiments the single uniform surface provides an appearance of uniform completeness such that the overmold 640, cable retainer 610, and secure conferencing device 110 appear as a single unit. Further, cable 610 is not readily removable from secure conferencing device 110. Thus, the incidental removal of cable 630 is prevented.

Some embodiments include overmold 670 that can house a corresponding mate that couples to data port 660 on one end, and is contoured to cable retainer 664 via patterned tabs 672a and 672b and interlocking receptacles 675a and 675b as shown of example 690. Cable retainer 664 is secured to secure conferencing device 110 via fastener 620 at opening 665 which can be a threaded opening that enables fastener 620 to be secured. When cable retainer 664 is secured to secure conferencing device 110, the surface of secure conferencing device 110, cable retainer 610, and cable retainer 664 are flush, and appear as a single uniform surface. In this example, overmold 670 (shown) is connected to a USB-C cable (not shown), to which guest device 130 can readily connect. In some embodiments, cable retainer 664 can be a smooth cover to prevent a data cable from being connected at data port 660 (e.g., a USB-C data port.) Thus, the smooth cover can be flush with, match, and appear as a single uniform surface with secure conferencing device 110.

While not shown, in some embodiments an overmold and cable retainer corresponding to data port 668 are possible, where the combinations of the cable retainers with the surface of secure conferencing device 110 present a surface that appears as a single continuous plane. Thus, cable retainers 610 and/or 664 can prevent cables from being readily removed and/or prevent the insertion of other cables (e.g., guest cables) to corresponding ports of secure conferencing device 110.

Example 690 provides an example of patterned tabs 645a and 645b on overmold 640 that interlocks with corresponding receptacles 615a and 615b on cable retainer 610. In some embodiments, overmold 640 can include a flexible rubberized material or a hard plastic sufficient so that patterned tabs 645a and 645b do not flex to disconnect from a short wipe length on connector pins connecting to video port 650, or from cable retainer 610 when cable 630 and/or overmold 640 are pulled. In some embodiments overmold 640 is larger than a corresponding standard specification (e.g., HDMI specification) to accommodate patterned tabs 645a and 645b. Patterned tabs 645a and 645b are exemplary patterns and other designs are possible with interlocking receptacles 615a and 615b. For example, in some embodiments patterned tabs 645a and 645b are the same and in some embodiments they are different. The same applies to patterned tabs 672a and 672b and interlocking receptacles 675a and 675b.

Figure 7:
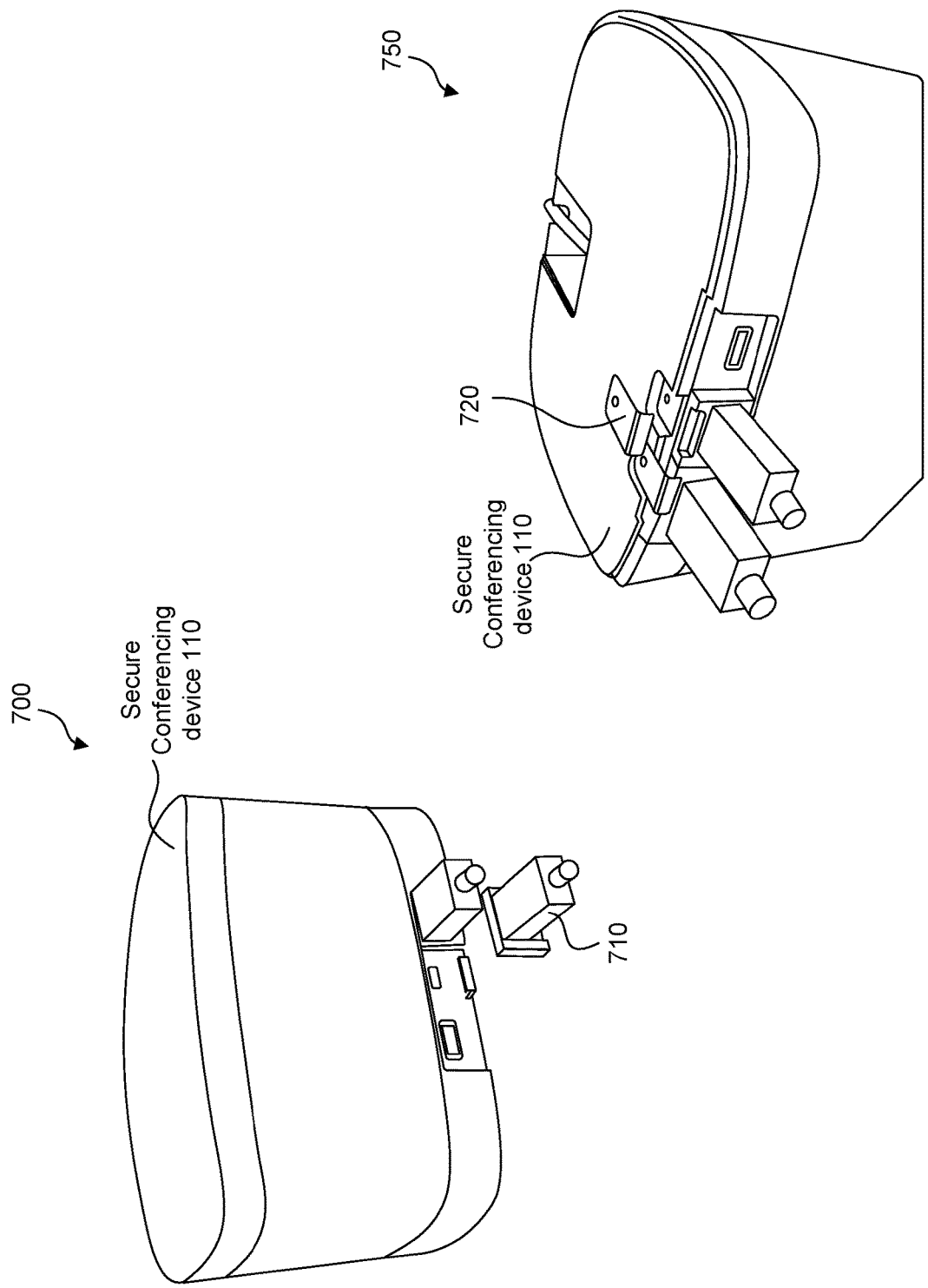
FIG. 7 illustrates other examples of cable retainers for a secure conferencing device, according to an exemplary embodiment of the disclosure.

FIG. 7 illustrates other examples of cable retainers for a secure conferencing device, according to an exemplary embodiment of the disclosure. As a convenience and not a limitation, system 700 may be described with elements from FIGS. 1-6. Example 700 includes overmold 710 that fits snugly with secure conferencing device 110. Example 750 shows that overmold 710 can be secured in place with plate 720 that can be fastened on the underside of secure conferencing device 110.

Figure 8:
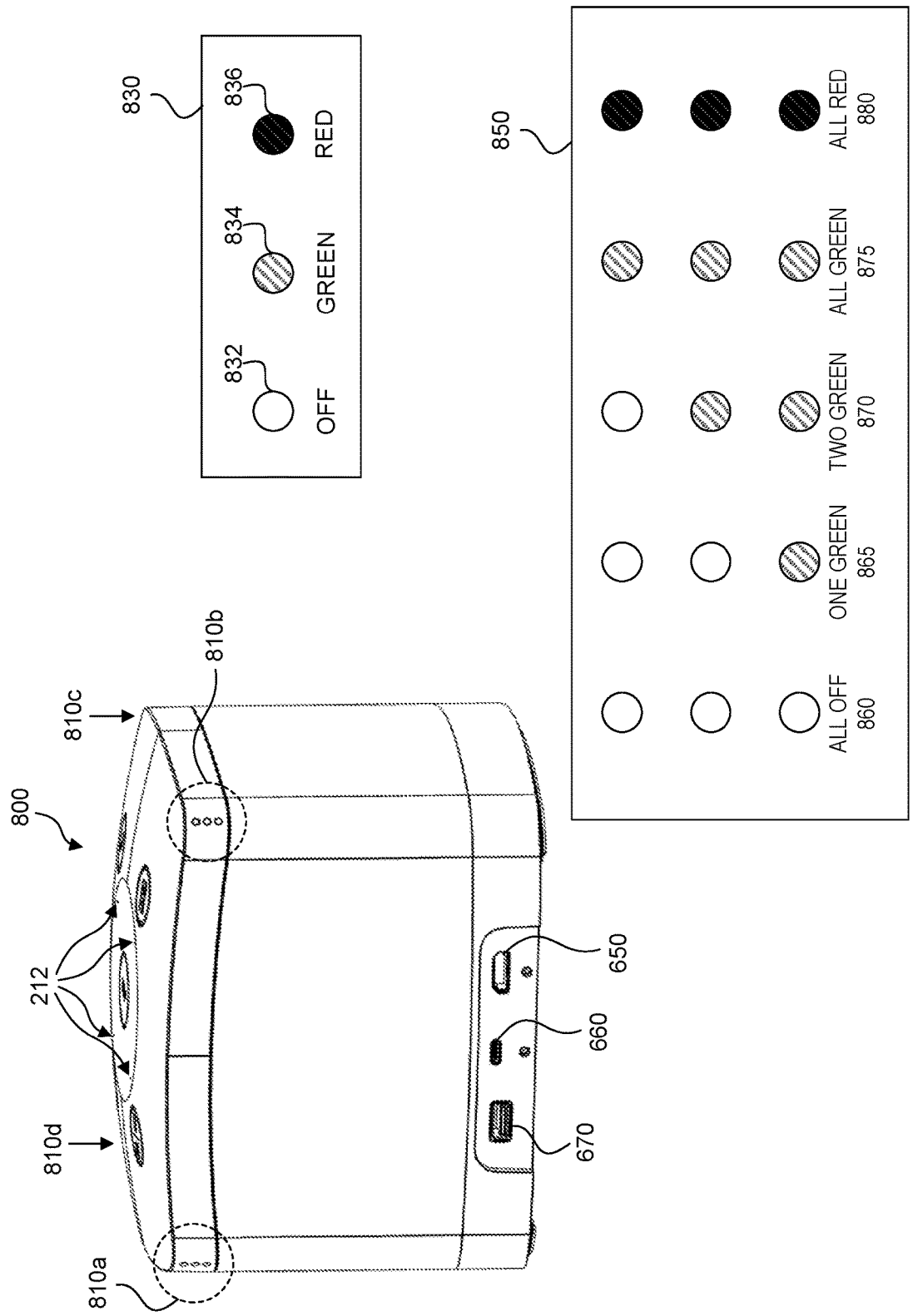
FIG. 8 illustrates examples of visual remote feedback for a secure conferencing device, according to an exemplary embodiment of the disclosure.

FIG. 8 illustrates examples of visual remote feedback for a secure conferencing device, according to an exemplary embodiment of the disclosure. As a convenience and not a limitation, system 800 may be described with elements from FIGS. 1-7. During a conference meeting, speakers often depend on listener feedback to determine whether their voices are being received within a desired microphone signal strength range. This feedback can be uncomfortable for listeners to provide as they typically interrupt a presentation and sometimes the flow of a discussion. Some embodiments provide feedback to speakers/presenters without a listener having to interrupt the presenter. Thus, presenters can adjust accordingly so that listeners, even remote meeting participants 245 and 345 can have a positive experience. Some embodiments provide feedback on microphone signal strength, including microphone signal strength based on a location relative to one or more microphones 212, local network quality, video display quality, and/or display feedback.

Example 800 includes one or more sets of visual indicators 810 that corresponds to a quality of an audio signal received by one or more microphones 212 of secure conferencing device 110. In some embodiments a set of visual indicators 810 is located at locations on a perimeter of secure conferencing device 110 as shown in example 800 with 810a, 810b, 810c, and 810d. A set of visual indicators 810 can include one or more LEDs. In example 800, a set of visual indicators 810 includes 3 LEDs vertically aligned, but other numbers and combinations of LEDs are possible to convey feedback information.

In some embodiments one or more processors 290 (e.g., main processor 490) receives microphone signals from one or more microphones 212. Main processor 490 can monitor the level and quality of the microphone signals and also controls the states of one or more sets of visual indicators 810 that can be represented by LEDs 454 of FIG. 4. Main processor 490 can map a status of secure conferencing device 110, including a status of the microphone signals to the combinations of LEDs that make up one or more sets of visual indicators 810 (e.g., LED triple states as shown in example 850.) Thus, main processor 490 can enable secure conferencing device 110 to provide feedback to meeting room participants on the levels of microphone signals being transmitted to remote meeting participants 245 or 345. In addition to microphone signals, some embodiments can include visual feedback regarding local network quality, video display quality, and/or display feedback as described below.

For example, when secure conferencing device 110 is in host mode, main processor 490 can convey the feedback information to/from conferencing software 235 via USB HUB 414, switch 412, connection 418, switch 416, connection 406, single cable 140, connection 474, switch 482, USB hub 484, switch 486, and connection 476 of FIG. 4. When secure conferencing device 110 is in guest mode, main processor 490 can convey the feedback information to/from conferencing software 335 via USB hub 414, switch 412, and connection 402. In some embodiments, main processor 490 can convey the feedback information to/from conferencing software 335 via switch 446, HDMI switch, and video connection 520.

Example 830 illustrates an example key mapping patterns in this disclosure to a possible LED state. For example, no pattern 832 indicates an LED is OFF, striped pattern 834 indicates a green LED, and filled pattern 836 indicates a red LED. Example 850 further indicates five states, 860, 865, 870, 875, and 880 of a set of visual indicators (e.g., 810*b*) that are coded to convey different feedback information. Note that additional combinations are possible with these three LEDs that are not shown such as the top and bottom LEDs being green with the middle LED being off.

Table 1 below demonstrates a possible correspondence between example 850 LED triple states and a status of audio data received via one or more microphones 212. For example, all off 860 can indicate that secure conferencing device is turned off; one green 865 can indicate low audio data signal received by one or more microphones 212; two green 870 can indicate a better audio signal data received by one or more microphones 212 but less than all green 875. All red 880 can indicate that the one or more microphones 212 are muted (e.g., a button of one or more buttons 456 can include a mute button that is pressed.)

TABLE 1

Correspondence between States and Microphone Signals

| State | Secure Conferencing Device 110 Status |
| --- | --- |
| All OFF | Secure conferencing device is turned off |
| One Green | Low microphone signal volume or no sound |
| Two Green | Medium microphone signal volume as is desirable for teleconferencing |
| All Green | Strong microphone signal value as is desirable for teleconferencing |
| All Red | Mute |

In some examples the set of visual indicators 810*a*-810*d* display the same information so that participants in the meeting room receive the same information (e.g., whether one or more microphones 212 is receiving adequate audio data quality.) In some examples, set of visual indicators 810*a* in proximity to a person who speaks softly will be different than set of visual indicators 810*c* in proximity to a person who speaks loudly as the one or more microphones 212 of secure conferencing device 110 will receive different audio data. In some embodiments set of visual indicators 810*a* corresponds to audio data received in proximity to set of visual indicators 810*a* by one or more microphones 212 that can be different than another set of visual indicators (e.g., 810*c*.)

In some embodiments, the one or more sets of visual indicators 810 also indicate a quality of a remote meeting participant experience (e.g., remote meeting participant 245 or 345.) For example, additional visual indicators can be added to a set of visual indicators 810*a* (not shown) to reflect the impact of decreasing network access quality (e.g., decreased bandwidth) on the meeting presenter side. Some effects experienced by remote meeting participant 245 or 345 can include but are not limited to: poor audio quality such as a voice signal that breaks up or desktop or application sharing feature that is not updated fast enough. In some embodiments remote meeting participant 245 or 345 can convey the remote meeting participant experience via conferencing software 235 or 335 to secure conferencing device 110. In turn, secure conferencing device 110 can reflect the remote meeting participant experience via a combination of visual indicators in a set of visual indicators 810*a* such as all red LEDs that flash indicating issues that may result in an undesirable user experience by remote meeting participant 245 or 345.

In an example, conferencing software 235 (on host computer 230) or conferencing software 335 (on guest device 130) can detect the local network speed in the meeting room and provide feed back to secure conferencing device 110 as shown below in Table 2. For example, a combination of LED patterns can provide feedback of remote meeting participant 245 or 345. LEDs red and flashing 2 times (to indicate a local network problem), followed by the combination of LEDs below (one yellow LED or two yellow LED); the combinations of patterns can be repeated (e.g., when the conditions persist.)

TABLE 2

Feedback on Local Network

| State | Secure Conferencing Device 110 Status |
| --- | --- |
| All LEDs red and flashing twice | Indicates a local network problem |
| One Yellow | Local network speed is marginal, may affect user experience on the other meeting side (such as slower image flashing, breaking voice sound) |
| Two Yellow | Very poor network connection |

Some conference software use a large portion of a display window to show the video of other sides of the meeting (e.g., remote meeting participant 245, 345), and the video display of a local meeting participant is usually is a very small window on the display. Thus, participants in the meeting room may not notice if there are video capture quality issues that remote meeting participant 245, 345 may experience. As remote meeting participants typically do not want to interrupt a presentation to provide feedback on technical issues, LED combinations as described below can be used as additional indicators of such issues. In some examples, software features on conferencing software 235 and/or host computer 230 or conferencing software 335 and/or guest device 130 can determine the video capture quality and provide feedback to secure conferencing device 110. As shown below in Table 3, a combination of LED patterns can be used: All LEDs in red and flashing 3 times (to indicate video quality problem), followed by the behavior below (one red LED or two red LED). The pattern can be repeated when the conditions persist.

TABLE 3

Feedback on Video Quality

| State | Secure Conferencing Device 110 Status |
|---|---|
| All LEDs red and flashing three times | Indicates a video quality problem |
| One Red | Marginal video capture quality |
| Two Red | Serious issue during video capture |

In some examples, a desktop image, application, and/or font may be too small or too large for remote meeting participants 245 or 345. Conferencing software 235 or 335 can enable remote meeting participants 245 or 345 to provide feedback that can be reflected on one or more sets of visual indicators 810. For example, as shown in Table 4, a display problem can be conveyed via a set of visual indicators (e.g., 3 LEDs) in combination such as: All LEDs in red and flashing 4 times (to indicate sharing content issue), followed by the behavior below (one red or one yellow LED), and the same pattern can be repeated.

TABLE 4

Display Feedback

| State | Secure Conferencing Device 110 Status |
|---|---|
| All LEDs red and flashing four times | Indicates a display quality problem |
| One Red | Desktop image/font shared is too small on the display of the other meeting side, may need be readjusted |
| One Yellow | Desktop image/font shared is too large on the display of the other meeting side, may need be readjusted |

Figure 9:
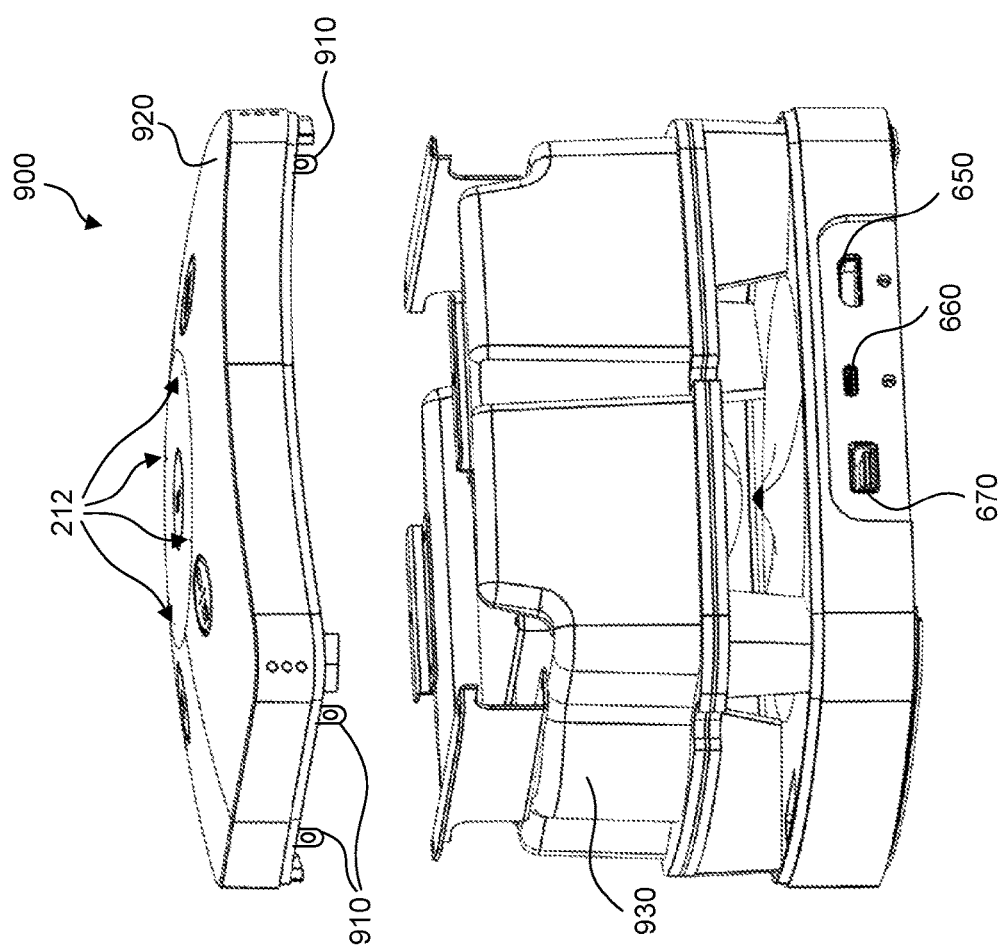
FIG. 9 illustrates an example of acoustic separation for a secure conferencing device, according to an exemplary embodiment of the disclosure.

FIG. 9 illustrates an example system 900 of acoustic separation for a secure conferencing device, according to an exemplary embodiment of the disclosure. As a convenience and not a limitation, system 900 may be described with elements from FIGS. 1-8. System 900 includes cap 920 that includes one or more microphones 212, and tabs 910 that secure cap 920 to housing 930 that includes speaker 214. Tabs 910 may include dampening material such as rubber grommets or washers that enhance vibration isolation of audio output from speaker 214 and input audio data to one or more microphones 212.

Some embodiments minimize acoustic coupling from speaker 214 and one or more microphones 212, where microphones 212 are located on cap 920 of secure conferencing device 110 behind small air holes in cap 920's surface. In particular, speaker 214 located within housing 930 is placed near the bottom of secure conferencing device 110 of example 900 in a downward direction away from microphones 212 such that layers of material and space between speaker 214 and microphones 212 provide acoustic isolation.

Figure 10:
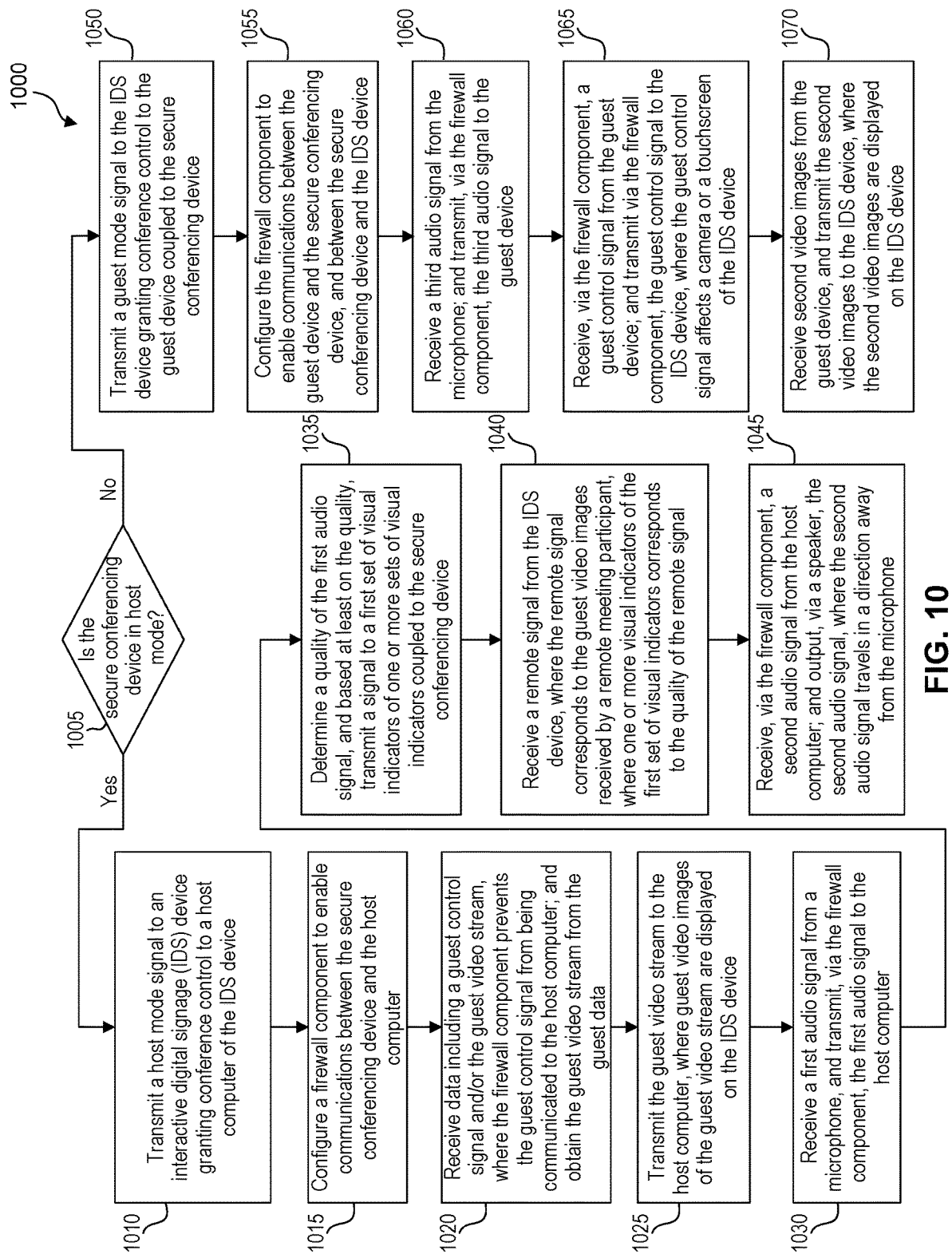
FIG. 10 illustrates an example method for a secure conferencing device, according to an exemplary embodiment of the disclosure.

FIG. 10 illustrates an example method 1100 for a secure conferencing device, according to an exemplary embodiment of the disclosure. As a convenience and not a limitation, method 1000 may be described with elements from FIGS. 1-9. For example, method 1100 can be performed by one or more processors 290, main processor 490, and/or arbitration processor 495. Method 1000 can also be performed by computer system 1200 of FIG. 12 described below.

At 1005 method 1000 determines whether secure conferencing device 110 is in host mode or guest mode. When a secure conferencing device is in host mode, method 1000 proceeds to 1010. Otherwise, secure conferencing device 110 is in guest mode and method 1000 proceeds to 1050. For example, one or more processors 290 determine whether secure conferencing device 110 is in host mode or guest mode.

At 1010, method 1000 transmits a host mode signal to an interactive digital signage (IDS) device granting conference control to a host computer of the IDS device. (See FIG. 4.) For example, one or more processors 290 transmit the host mode signal to IDS device 120 via single cable 140.

At 1015, method 1000 configures a firewall component to enable communications between a secure conferencing device and the host computer. For example, one or more processors 290 configures firewall component 410 to enable receipt and transmission of control and audio signals from host computer 230 of IDS device 120.

At 1020, method 1000 receives guest data including a guest control signal and/or the guest video stream, where the firewall component prevents the guest control signal from being communicated to the host computer, and obtains the guest video stream from the guest data. For example, one or more processors 290 can receive guest data from guest device 130 via one or more ports. The guest data can include a guest control signal and/or a guest video stream. If for example, the guest data is received via connection 404 (e.g., via a USB 3.0 port), the guest video stream is obtained by filtering the guest data by USB to HDMI 408. In some examples, the guest video stream is received via an HDMI port via video connection 442.

At 1025, method 1000 transmits the guest video stream to the host computer, where guest video images of the guest video stream are displayed on the IDS device. For example, one or more processors 290 enable the guest video stream to be transmitted via video connection 450 and single cable 140 to IDS device 120. For example, one or more processors 220 enable the guest video stream to be transmitted via video connection 472 to conferencing software 235 of host computer 230 for processing. After processing, conferencing software 235 transmits (via host computer 230), corresponding guest video images via video connection 427 to one or more processors 220, for display on LCD 210.

At 1030, method 1000 receives a first audio signal from a microphone, and transmits, via the firewall component, the first audio signal to the host computer. For example, one or more processors 220 receive a first audio signal from one or more microphones 212. One or more processors 220 can transmit via firewall component 410 and single cable 140, the first audio signal to host computer 230 of IDS device 120.

At 1035, method 1000 determines a quality of the first audio signal, and based at least on the quality, transmits a signal to a first set of visual indicators of one or more sets of visual indicators coupled to the secure conferencing device. For example, one or more processors 290 may determine the quality of the first audio signal, map a status of the microphone signals to the combinations of LEDs that make up one or more sets of visual indicators 810 (e.g., LED triple states as shown in example 850) and activate the one or more sets of visual indicators 810 accordingly to provide feedback to meeting room participants on the levels of microphone signals being transmitted to remote meeting participants.

At 1040, method 1000 receives a remote signal from the IDS device, where the remote signal corresponds to the guest video images received by a remote meeting participant, where one or more visual indicators of the first set of visual indicators corresponds to a quality of the remote signal. The quality can correspond to local network quality, video display quality, and/or display feedback. For example, one or more processors 290 can receive a remote signal from conferencing software 235 of host computer 230 of IDS device 120 via firewall component 480, single cable 140, and firewall component 410. The quality of the remote signal can correspond to local network quality such as the bandwidth and hence speed of access of the hosting company's secure network, video display quality as experienced by a remote meeting participant 245, and/or display feedback as experienced by a remote meeting participant 245.

At 1045, method 1000 receives, via the firewall component, a second audio signal from the host computer; and outputs, via a speaker, the second audio signal, where the second audio signal travels in a direction away from the microphone. For example, one or more processors 290 receive a second audio signal via firewall component 410, where the second audio signal can be received in response to the first audio signal transmitted to host computer 230 at 1030. One or more processors 290 can output the second audio signal via switch 446, codec 448, to speaker 214, where speaker 214 is positioned to output the second audio signal in a direction away from one or more microphones 212.

Returning to 1050, where the secure conferencing device is in guest mode, method 1000 transmits a guest mode signal to the IDS device granting conference control to the guest device coupled to the secure conferencing device. (See FIG. 5.) For example, a button of one or more buttons 456 may be pressed to change from a host mode to a guest mode. One or more processors 290 determines a change in modes and determines that secure conferencing device 110 is in guest mode. Accordingly, one or more processors 290 transmits a guest mode signal to IDS device 120 via single cable 140. IDS device 120 can configure firewall component 480 to enable guest control signals to reach USB hub 484, but prevent any guest control signals from reaching host computer 230.

At 1055, method 1000 configures the firewall component to enable communications between the guest device and the secure conferencing device, and between the secure conferencing device and the IDS device. For example, one or more processors 290 configures firewall component 410 to enable control and audio signals to be communicated between guest device 130 and secure conferencing device 110 as well as between secure conferencing device 110 and IDS device 120.

At 1060, method 1000 receives a third audio signal from the microphone, and transmits, via the firewall component, the third audio signal to the guest device. For example, one or more microphones 212 can receive a third audio signal, and one or more processors 290 can determine the quality of the first second signal, map a status of the third audio signal to the combinations of LEDs that make up one or more sets of visual indicators 810 (e.g., LED triple states as shown in example 850) and activate the one or more sets of visual indicators 810 accordingly to provide feedback to meeting room participants on the levels of microphone signals being transmitted to remote meeting participants. One or more processors 290 can transmit the third audio signal to guest device 130 via USB Hub 414, switch 412, and connection 402 for processing. In some embodiments, one or more processors 290 can transmit the third audio signal via switch 446, HDMI switch 444, and video connection 520 to guest device 130 for processing. In some embodiments, one or more processors receive a third audio signal from guest device 130 in response to transmitting the third audio signal. The third audio signal can be received via firewall component 410 or switch 446, for example. One or more processors enables the third audio signal to be output to speaker 214.

At 1065, method 1000 receives, via the firewall component, a guest control signal from the guest device, and transmits via the firewall component, the guest control signal to the IDS device, where the guest control signal affects component of the IDS device (e.g., a camera or a touchscreen of the IDS device.) For example, one or more processors 290 receives a guest control signal via firewall component 410 from guest device 130. One or more processors 290 transmits the guest control signal via firewall component 410 to IDS device 120 via single cable 140. The guest control signal can be received by firewall component 480 and then one or more processors 220, where the guest control signal can affect a component of IDS device 120 such as camera 125 or touchscreen 222.

At 1070, method 1000 receives second video images from the guest device, and transmits the second video images to the IDS device, where the second video images are displayed on the IDS device. For example, in guest mode, guest device 130 includes conferencing software 335 that processes any video streams (sourced from guest device 130 or remote meeting participant(s) 345) and provides guest video images to be presented on IDS device 120. Secure conferencing device 110 receives guest video images from guest device 130 and transmits the guest video images via video connection 530 to IDS device 120 via single cable 140 to be displayed on the IDS device.

Figure 11:
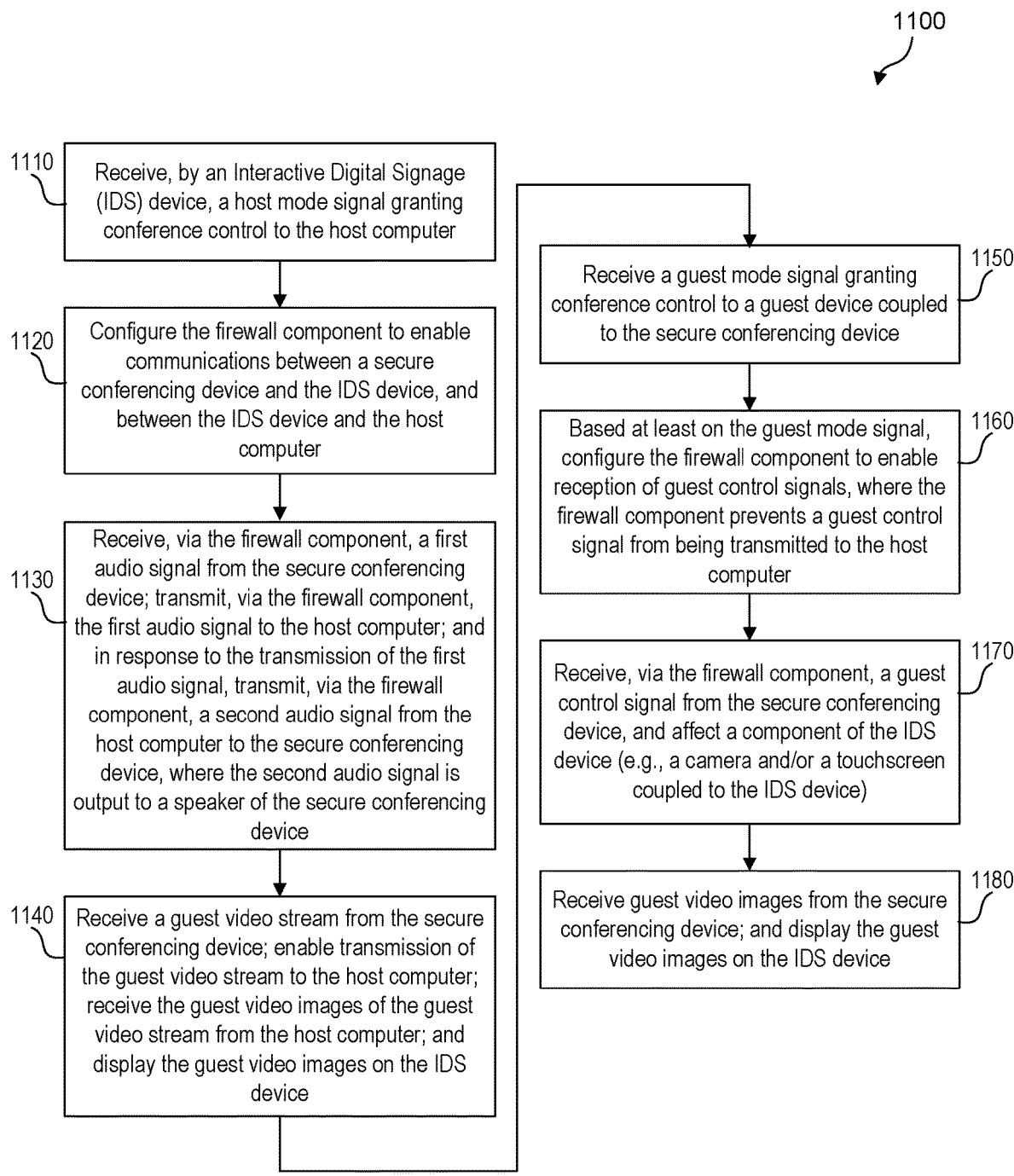
FIG. 11 illustrates an example method for an interactive digital signage (IDS) device coupled to a secure conferencing device, according to an exemplary embodiment of the disclosure.

FIG. 11 illustrates an example method 1100 for an IDS device coupled to a secure conferencing device, according to an exemplary embodiment of the disclosure. As a convenience and not a limitation, method 1100 may be described with elements from FIGS. 1-10. For example, method 1100 can be performed by one or more processors 220, main processor 420, and/or arbitration processor 425. Method 1100 can also be performed by computer system 1200 of FIG. 12 described below.

At 1110, method 1100 receives, by an IDS device, a host mode signal granting conference control to the host computer. For example, one or more processors 220 (e.g., arbitration processor 425 and/or main processor 420) can receive a host mode signal granting conference control to conferencing software 235 of host computer 230 of IDS device 120.

At 1120, method 1100 configures the firewall component to enable communications between a secure conferencing device and the IDS device, and between the IDS device and the host computer. For example, one or more processors 220 can configure firewall component 480 to enable communications between secure conferencing device 110 and communications software 235 of host computer 230.

At 1130, method 1100 receives, via the firewall component, a first audio signal from the secure conferencing device, and transmits, via the firewall component, the first audio signal to the host computer; in response to the transmission of the first audio signal, method 1100 transmits, via the firewall component, a second audio signal from the host computer to the secure conferencing device, where the second audio signal is output to a speaker of the secure conferencing device. For example, one or more processors 220 receives via firewall component 480 (e.g., switch 482 and USB hub 484), the first audio signal from secure conferencing device 110. The one or more processors 220 transmits the first audio signal via firewall component 480 (e.g., USB hub 484 and switch 486) to conferencing software 235 of host computer 230 for processing. After processing, conferencing software 235 transmits a second audio signal corresponding to the first audio signal to secure conferencing device 110 for output on speaker 214. One or more processors 220 enable the transmission of the second audio signal via firewall component 480 and single cable 140.

At 1140, method 1100 receives a guest video stream from the secure conferencing device, enables transmission of the guest video stream to the host computer, receives the guest video images of the guest video stream from the host computer, and displays the guest video images on the IDS device. For example, one or more processors 220 enables transmission of a guest video stream received via single cable 140 from secure conferencing device 110, where the guest video stream is transmitted via video connection 472 to conferencing software 235 of host computer 230. Conferencing software 235 processes the guest video stream and transmits (via host computer 230) corresponding guest video images via video connection 427 to one or more processors 220. One or more processors 220 enable the guest video images to be displayed on LCD 210.

At 1150, method 1100 receives a guest mode signal granting conference control to a guest device coupled to the secure conferencing device. For example, one or more processors 220 receives a guest mode signal via single cable 140 from secure conferencing device 110.

At 1160, based at least on the guest mode signal, method 1100 configures the firewall component to enable reception of guest control signals, where the firewall component prevents a guest control signal from being transmitted to the host computer. For example, one or more processors 220 configures firewall component 480 such that switch 486 prevents a guest control signal from being transmitted to host computer 230.

At 1170, method 1100 receives, via the firewall component, a guest control signal from the secure conferencing device, and affects a component of the IDS device (e.g., a camera and/or a touchscreen coupled to the IDS device.) For example, one or more processors 220 receives a guest control signal via firewall component 480 (e.g., connection 474, switch 482, connection 488, switch 486, and USB hub 484. One or more processors 220 affect a component of IDS device 120 such as touchscreen 222 and camera 125.

At 1180, method 1100 receives guest video images from the secure conferencing device; and display the guest video images on the IDS device. For example, one or more processors 220 enables reception of guest video images on video connection 540 and enables the display of the guest video images on LCD 210.

Figure 12:
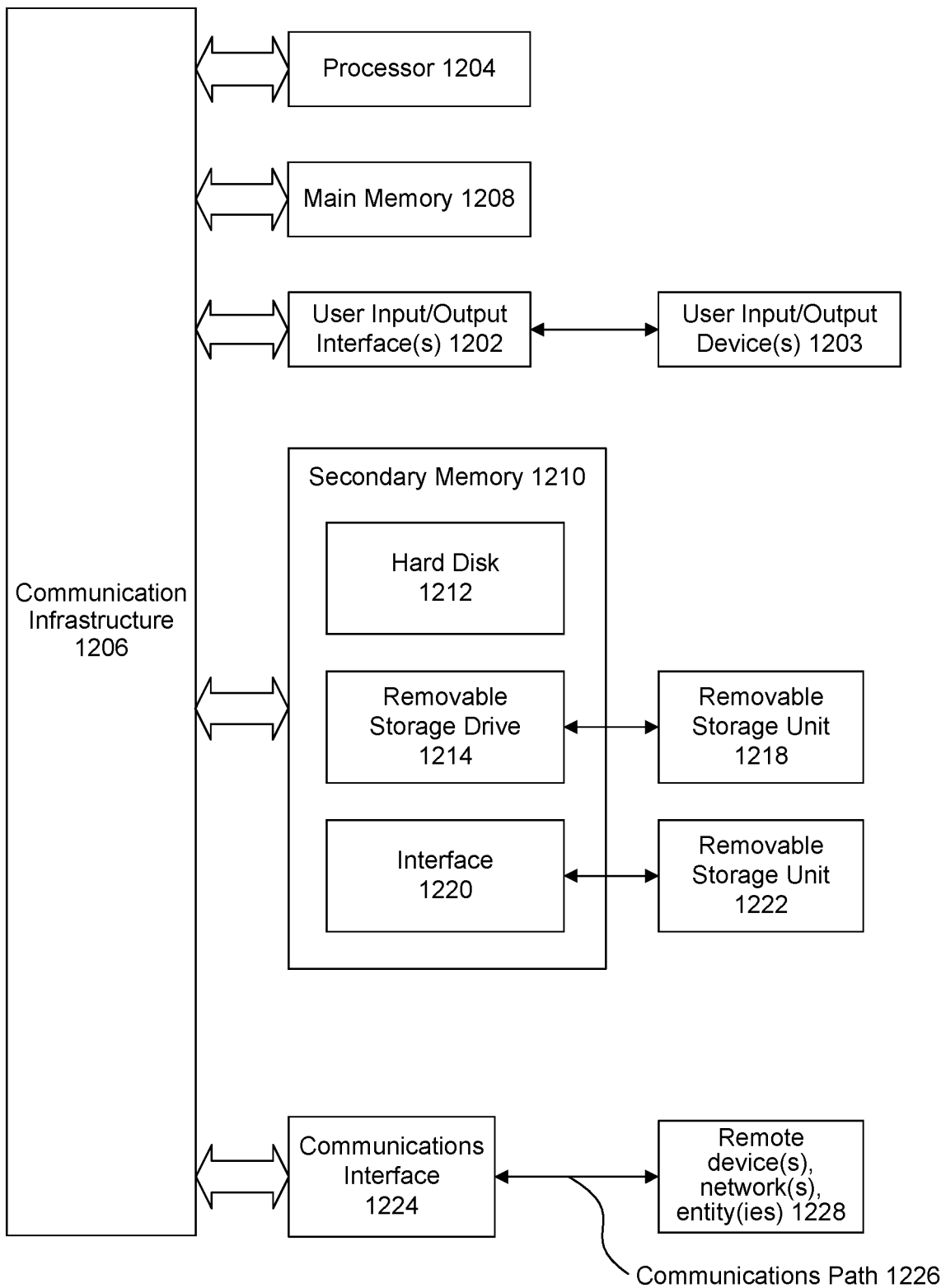
FIG. 12 illustrates an example computer system useful for implementing and/or using various embodiments.

Various embodiments can be implemented, for example, using one or more well-known computer systems, such as computer system 1200 shown in FIG. 12. Computer system 1200 can be any well-known computer capable of performing the functions described herein such as secure conferencing device 110, IDS device 120, host computer 230, method 1000 of FIG. 10, and method 1100 of FIG. 11.

Computer system 1200 includes one or more processors (also called central processing units, or CPUs), such as a processor 1204. Processor 1204 is connected to communication infrastructure 1206 (e.g., a bus). One or more processors 1204 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc. Computer system 1200 also includes user input/output device(s) such as monitors, keyboards, pointing devices, etc., that communicate with communication infrastructure 1206 through user input/output interface(s) 1202.

Computer system 1200 also includes a main or primary memory 1208, such as random access memory (RAM). Main memory 1208 may include one or more levels of cache. Main memory 1208 has stored therein control logic (i.e., computer software) and/or data. Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 includes a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 reads from and/or writes to removable storage unit 1218 in a well-known manner.

According to an exemplary embodiment, secondary memory 1210 may include other means, instrumentalities or other approaches for allowing computer programs and/or other instructions and/or data to be accessed by computer system 1200. Such means, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 may allow computer system 1200 to communicate with remote devices 1228 over communications path 1226, which may be wired, and/or wireless, and which may include any combination of LANs, WANs, the Internet, etc. Control logic and/or data may be transmitted to and from computer system 1200 via communication path 1226.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), causes such data processing devices to operate as described herein.

The foregoing description, for purposes of explanation, used specific nomenclature to provide a thorough understanding of the disclosure. However, it will be apparent to one skilled in the art that specific details are not required in order to practice the disclosure. Thus, the foregoing descriptions of specific embodiments of the disclosure are presented for purposes of illustration and description. They are not intended to be exhaustive or to limit the disclosure to the precise forms disclosed; obviously, many modifications and variations are possible in view of the above teachings. The embodiments were chosen and described in order to best explain the principles of the disclosure and its practical applications, they thereby enable others skilled in the art to best utilize the disclosure and various embodiments with various modifications as are suited to the particular use contemplated. It is intended that the following claims and their equivalents define the scope of the disclosure.

Based on the teachings contained in this disclosure, it will be apparent to persons skilled in the relevant art(s) how to make and use embodiments of the disclosure using data processing devices, computer systems and/or computer architectures other than that shown in FIG. 12. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments. Further, the claims should be defined only in accordance with their recitations and their equivalents.

What is claimed is:

1. An electronic secure conferencing device comprising:
a firewall component;
a microphone; and
one or more processors coupled to the firewall component and to the microphone, wherein the one or more processors are configured to:
transmit a host mode signal to an interactive digital signage (IDS) device granting conference control to a host computer of the IDS device;
based at least on the host mode signal, configure the firewall component to enable communications between the one or more processors and the host computer;
receive data via a universal serial bus (USB) cable, wherein the data comprises a guest control signal and a guest video stream, and wherein the firewall component prevents the guest control signal from being communicated to the host computer;
receive a first audio signal from the microphone;
transmit, via the firewall component, the first audio signal to the host computer; and
transmit the guest video stream to the host computer, wherein first video images of the guest video stream are displayed on the IDS device.

2. The electronic secure conferencing device of claim 1, wherein to transmit the host mode signal, the one or more processors are configured to:
transmit, via a single cable, the host mode signal to the IDS device, wherein the single cable is capable of transmitting video, audio, and control data.

3. The electronic secure conferencing device of claim 1, further comprising:
a cable retainer that interlocks with a portion of the USB cable from which the guest video stream is received, wherein the cable retainer is affixed to the electronic secure conferencing device, and wherein the cable retainer and an exterior of the electronic secure conferencing device appear as a uniform surface.

4. The electronic secure conferencing device of claim 1, further comprising:
one or more sets of visual indicators located on a perimeter of the electronic secure conferencing device coupled to the one or more processors, wherein the one or more processors are configured to:
determine a first quality of the first audio signal; and
based at least on the first quality, transmit a signal to a first set of visual indicators of the one or more sets of visual indicators, wherein the first set of visual indicators corresponds to the first quality, and wherein the first set of visual indicators are in closer proximity to a direction in which the first audio signal is received compared to the one or more remaining sets of visual indicators.

5. The electronic secure conferencing device of claim 4, wherein the one or more processors are configured to:
receive a remote signal from the IDS device, wherein the remote signal corresponds to the first video images or the first audio signal received by a remote meeting participant, and wherein one or more visual indicators of the first set of visual indicators corresponds to a second quality of the remote signal.

6. The electronic secure conferencing device of claim 1, further comprising:
a speaker positioned a distance from the microphone, wherein output from the speaker is directed away from the microphone, wherein the speaker is coupled to the one or more processors, and wherein the one or more processors are configured to:
receive, via the firewall component, a second audio signal from the host computer; and
output, via the speaker, the second audio signal, wherein the second audio signal travels in a direction away from the microphone.

7. The electronic secure conferencing device of claim 1, wherein the one or more processors are further configured to:
transmit a guest mode signal to the IDS device granting conference control to a guest device coupled to the electronic secure conferencing device;
based at least on the guest mode signal, configure the firewall component to enable communications between the guest device and the one or more processors, and between the one or more processors and the IDS device;
receive a second audio signal from the microphone; and
transmit, via the firewall component, the second audio signal to the guest device.

8. The electronic secure conferencing device of claim 7, wherein the one or more processors are further configured to:
receive, via the firewall component, a guest control signal from the guest device; and
transmit via the firewall component, the guest control signal to the IDS device, wherein the guest control signal affects a camera or a touchscreen of the IDS device.

9. The electronic secure conferencing device of claim 7, wherein the one or more processors are further configured to:
receive second video images from the guest device; and
transmit the second video images to the IDS device, wherein the second video images are displayed on the IDS device.

10. An interactive digital signage (IDS) device comprising:
a firewall component;
a host computer; and
one or more processors coupled to the firewall component and the host computer, wherein the one or more processors are configured to:
receive a host mode signal granting conference control to the host computer;
based at least on the host mode signal, configure the firewall component to enable communications between an electronic secure conferencing device and the one or more processors, and between the one or more processors and the host computer;
receive, via the firewall component, a first audio signal from the electronic secure conferencing device;
transmit, via the firewall component, the first audio signal to the host computer;
in response to the transmission of the first audio signal, transmit, via the firewall component, a second audio signal from the host computer to the electronic secure conferencing device, wherein the second audio signal is output to a speaker of the electronic secure conferencing device;
receive a guest mode signal granting conference control to a guest device coupled to the electronic secure conferencing device; and
based at least on the guest mode signal, configure the firewall component to enable reception of guest control signals, wherein the firewall component prevents a guest control signal from being transmitted to the host computer.

11. The IDS device of claim 10, wherein the one or more processors are further configured to:
receive a guest video stream from the electronic secure conferencing device;
enable transmission of the guest video stream to the host computer;
receive guest video images of the guest video stream from the host computer; and
display the guest video images on the IDS device.

12. The IDS device of claim 10, wherein the one or more processors are configured to:
receive, via the firewall component, the guest control signal from the electronic secure conferencing device;
based on at least the guest control signal, affect a camera or a touchscreen of the IDS device, wherein the camera and the touchscreen are coupled to the one or more processors.

13. The IDS device of claim 10, wherein the one or more processors are configured to:
receive guest video images from the electronic secure conferencing device; and
display the guest video images on the IDS device.

14. A method for a secure conferencing device comprising:
transmitting a host mode signal to an interactive digital signage (IDS) device granting conference control to a host computer of the IDS device;
based at least on the host mode signal, configuring a firewall component to enable communications between the secure conferencing device and the host computer;
receiving data via a universal serial bus (USB) cable, wherein the data comprises a guest control signal and a guest video stream, and wherein the firewall component prevents the guest control signal from being communicated to the host computer;
receiving a first audio signal from a microphone;
transmitting, via the firewall component, the first audio signal to the host computer; and
transmitting the guest video stream to the host computer, wherein first video images of the guest video stream are displayed on the IDS device.

15. The method of claim 14, further comprising:
transmitting a guest mode signal to the IDS device granting conference control to a guest device coupled to the secure conferencing device;
based at least on the guest mode signal, configuring the firewall component to enable communications between the guest device and the secure conferencing device, and between the secure conferencing device and the IDS device;
receiving a second audio signal from the microphone; and
transmitting, via the firewall component, the second audio signal to the guest device.

16. The method of claim 15, further comprising:
receiving, via the firewall component, a guest control signal from the guest device; and
transmitting via the firewall component, the guest control signal to the IDS device, wherein the guest control signal affects a camera or a touchscreen of the IDS device.

17. The method of claim 15, further comprising:
receiving second video images from the guest device; and
transmitting the second video images to the IDS device, wherein the second video images are displayed on the IDS device.

18. The method of claim 14, further comprising:
determining a first quality of the first audio signal; and
based at least on the first quality, transmitting a signal to a first set of visual indicators of one or more sets of visual indicators, wherein the first set of visual indicators corresponds to the first quality, and wherein the first set of visual indicators are in closer proximity to a direction in which the first audio signal is received compared to the one or more remaining sets of visual indicators.

19. The method of claim 18, further comprising:
receiving a remote signal from the IDS device, wherein the remote signal corresponds to the first video images or the first audio signal received by a remote meeting participant, and wherein one or more visual indicators of the first set of visual indicators corresponds to a second quality of the remote signal.

20. The method of claim 14, further comprising:
receiving a second audio signal from the host computer; and transmitting the second audio signal via a speaker positioned a distance from the microphone, wherein output from the speaker is directed away from the microphone.

* * * * *